US007262899B2

(12) United States Patent
Bigman

(10) Patent No.: US 7,262,899 B2
(45) Date of Patent: Aug. 28, 2007

(54) ELECTROCHEMICALLY CONTROLLED OPTICAL DEVICES

(76) Inventor: Joel Bigman, 13 Dolzin Street, Haifa (IL) 32882

( * ) Notice: Subject to any disclaimer, the term of this patent is extended or adjusted under 35 U.S.C. 154(b) by 0 days.

(21) Appl. No.: 10/531,300

(22) PCT Filed: Oct. 15, 2003

(86) PCT No.: PCT/IL03/00838

§ 371 (c)(1),
(2), (4) Date: Apr. 14, 2005

(87) PCT Pub. No.: WO2004/036256

PCT Pub. Date: Apr. 29, 2004

(65) Prior Publication Data

US 2006/0050358 A1    Mar. 9, 2006

Related U.S. Application Data

(60) Provisional application No. 60/418,314, filed on Oct. 15, 2002.

(51) Int. Cl.
*G02F 1/153* (2006.01)
(52) U.S. Cl. .................................... 359/269; 359/273
(58) Field of Classification Search ................ 359/245, 359/252–254, 256–258, 263, 265–275, 318, 359/320, 321; 385/140, 141; 345/49
See application file for complete search history.

(56) References Cited

U.S. PATENT DOCUMENTS 4,060,311 A    11/1977    Green
4,256,379 A    3/1981    Green
4,310,609 A    1/1982    Liang et al.
4,501,472 A    2/1985    Nicholson
4,790,635 A    12/1988    Apsley (Continued)

OTHER PUBLICATIONS

Rubin et al. "Optical Indices Of Lithiated Electrochromic Oxides", Ssolar Energy Materials and Solar Cells, 54: 49-57, 1998.

(Continued)

*Primary Examiner*—William Choi

(57) ABSTRACT

Optical devices, are provided, having a first conductive layer, an optical layer, arranged over the first conductive layer, and a second conductive layer, arranged over a portion of the optical layer, in accordance with a predetermined pattern. The optical layer is transparent to at least a wavelength of interest and has an index of refraction, which is a function of a variable, substantially reversible, dopant concentration or dopant concentration gradient in it. By applying an electric potential between the first and second conductive layers, a change in the index of refraction is formed within the optical layer, between the portion abut with the predetermined pattern and the remainder of the optical layer. Additionally, the present invention provides optical devices formed as stacks of layered constructions, each layered construction comprising a first conductive layer, an optical layer, arranged over the first conductive layer, and a second conductive layer, arranged over the optical layer, these layered constructions being operable as tunable interference filters.

25 Claims, 18 Drawing Sheets

U.S. PATENT DOCUMENTS

| | | | |
|---|---|---|---|
| 5,138,481 A * | 8/1992 | Demiryont | 359/269 |
| 5,202,788 A | 4/1993 | Weppner | |
| 5,311,350 A * | 5/1994 | Hiramatsu et al. | 359/263 |
| 5,684,612 A | 11/1997 | Wilde et al. | |
| 5,699,192 A | 12/1997 | Van Dine et al. | |
| 5,708,523 A | 1/1998 | Kubo et al. | |
| 6,085,015 A | 7/2000 | Armand et al. | |
| 6,091,184 A * | 7/2000 | De Vries | 313/110 |
| 6,183,910 B1 | 2/2001 | Praas et al. | |
| 6,542,264 B1 | 4/2003 | Agranat et al. | |

OTHER PUBLICATIONS

Granqvist "Progress in Electrochromics: Tungsten Oxide Revisited", Electrochimia Acta44: 3005-3015, 1999.

Ghodsi et al. "Optical and Electromic Properties of Sol-Gel Made $CeO_2$-$TiO_2$ Thin Film", Electrochimia Acta,44: 31237-3136, 1999.

Granqvist "Electrochromism and Smart Window Design",Solid State Ionics,53-56: 479-489, 1992.

\* cited by examiner

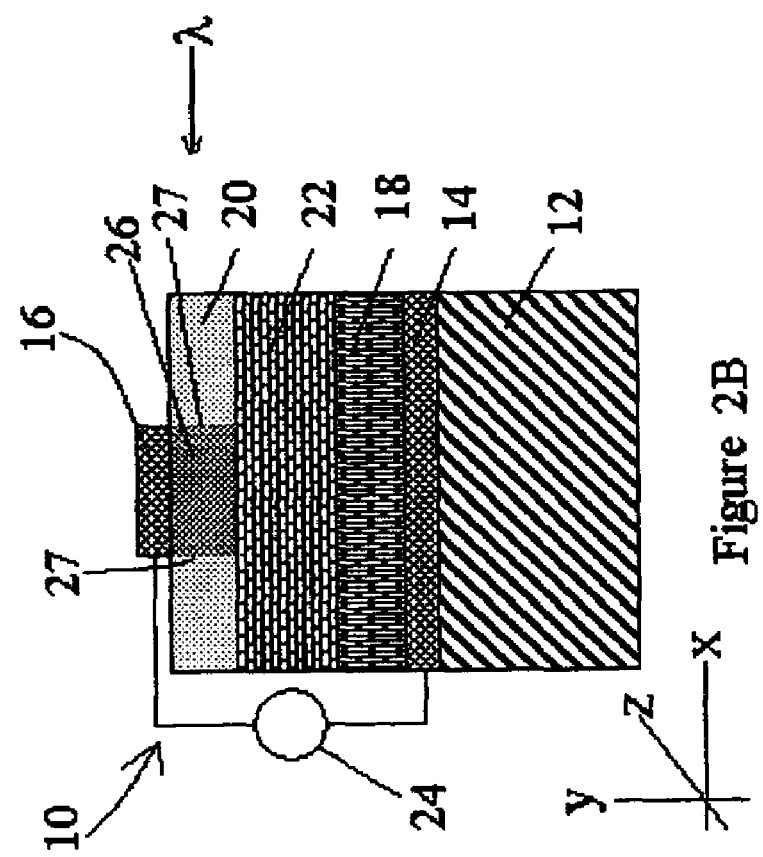
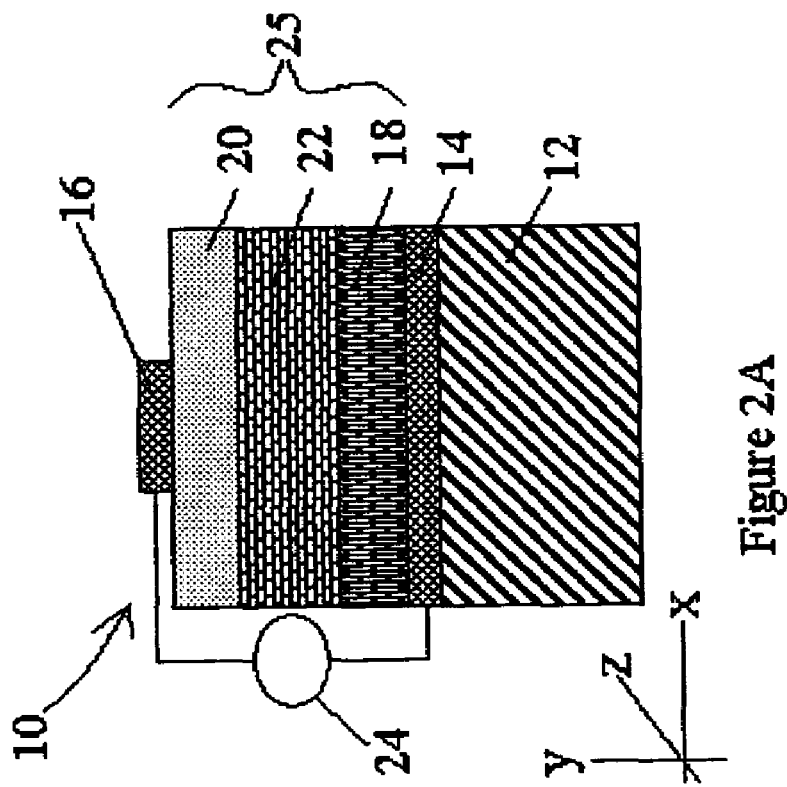

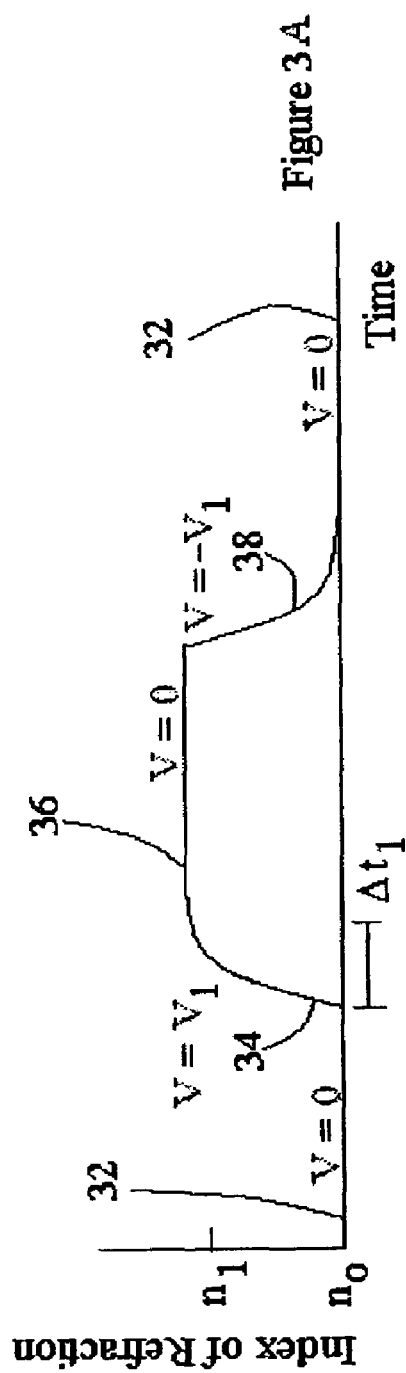
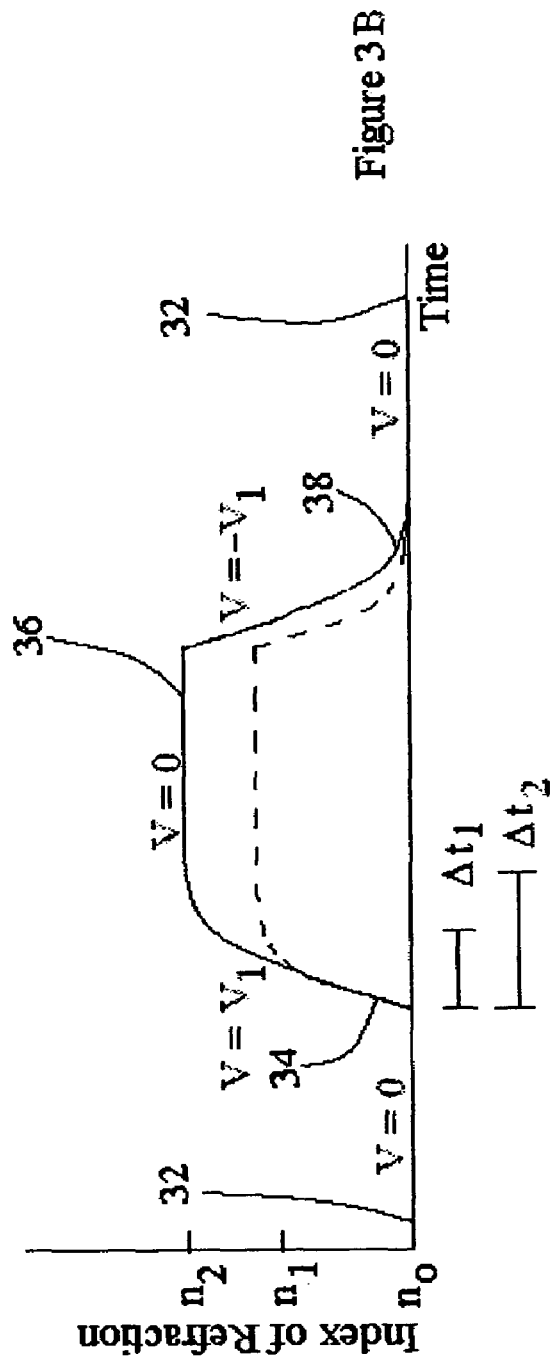

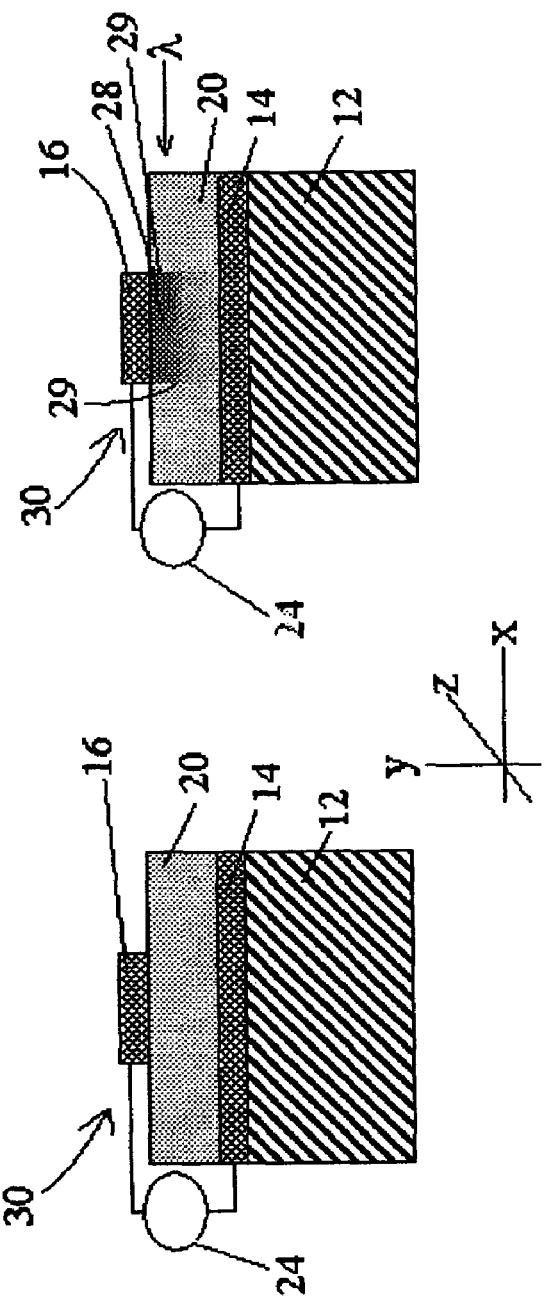

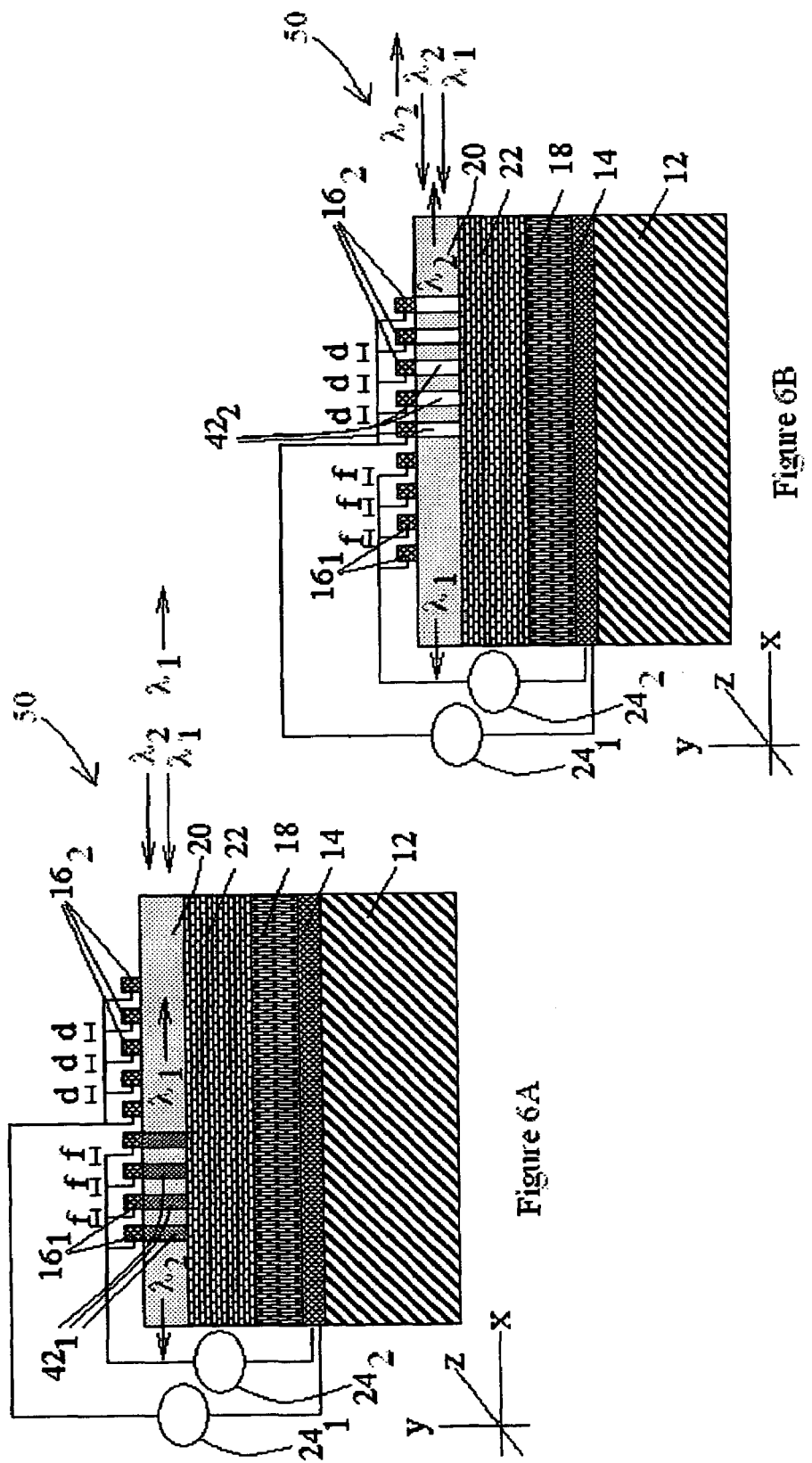

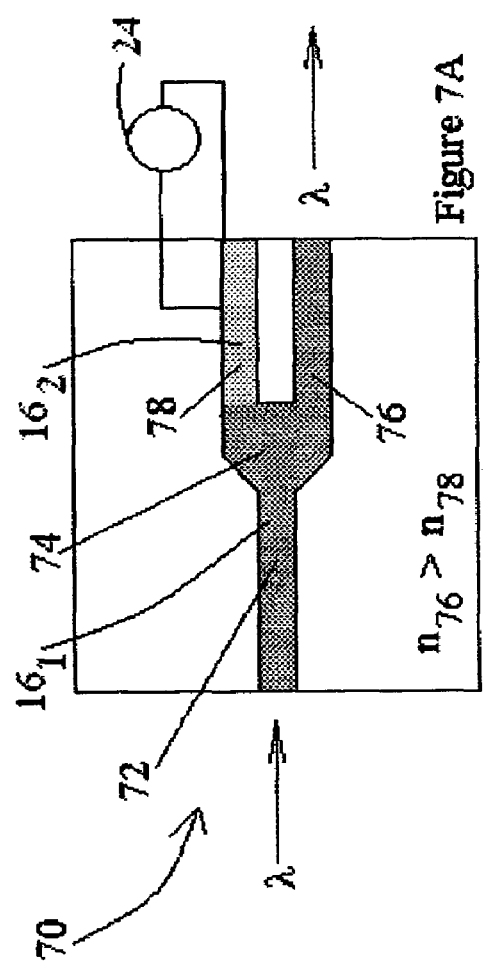
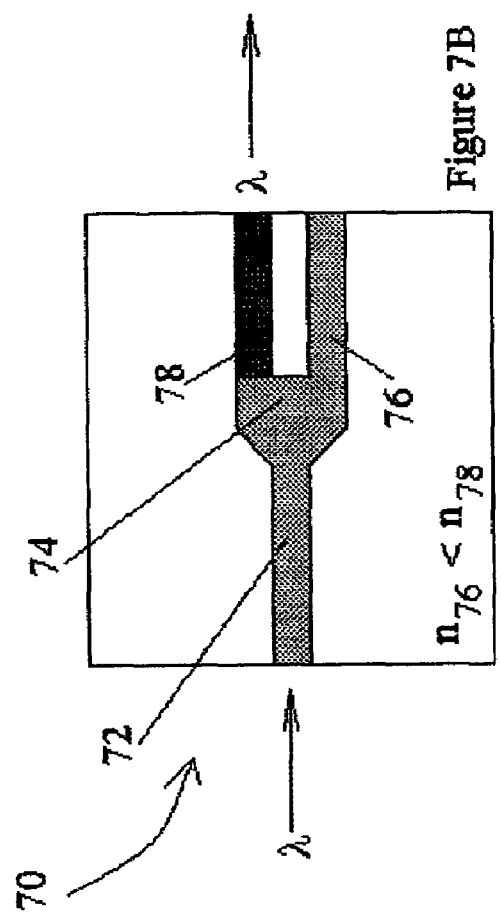

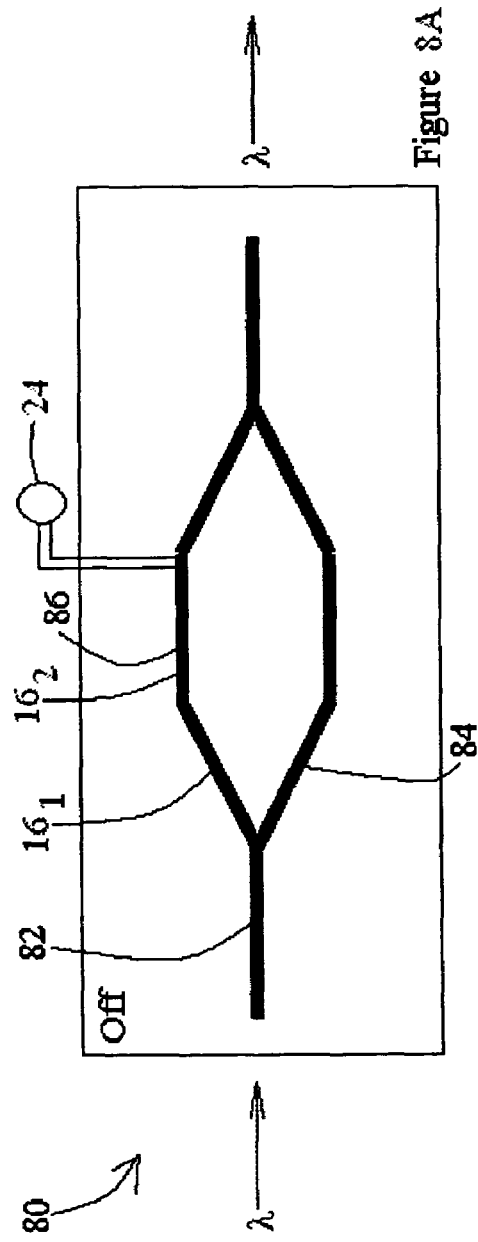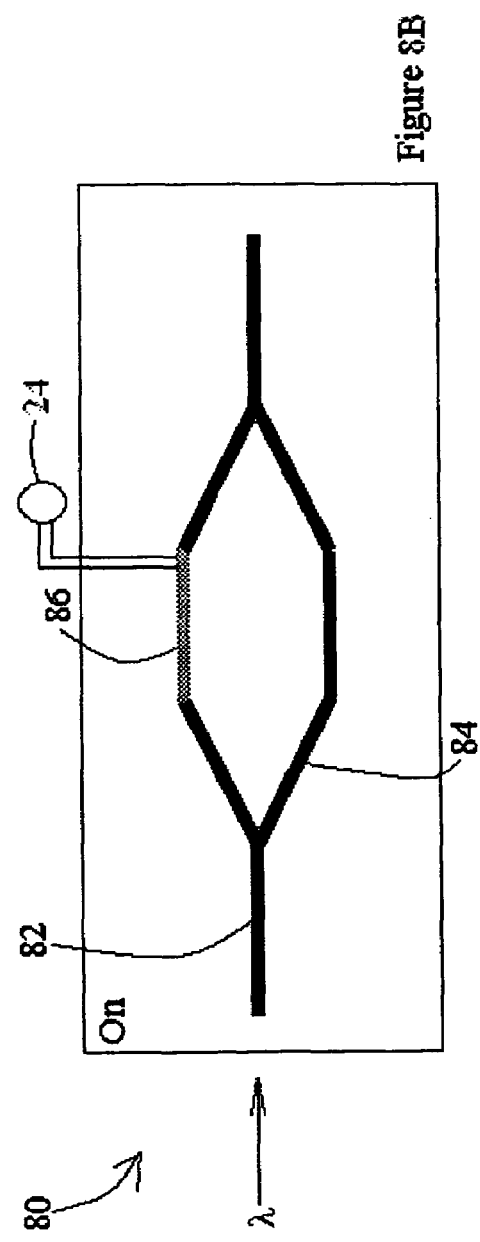

ELECTROCHEMICALLY CONTROLLED OPTICAL DEVICES

RELATED PATENT APPLICATION

This application is a National Phase Application of PCT/IL03/00838 having International Filing Date of 15 Oct. 2003, which claims priority from U.S. Provisional Patent Application No. 60/418,314 filed 15 Oct. 2002.

FIELD AND BACKGROUND OF THE INVENTION

The present invention relates to optical devices, which are controlled by electrochemical processes.

Optical switches, operable by the application of an electric field are known. For example, U.S. Pat. No. 6,542,264, to Agranat, et al., dated Apr. 1, 2003 and entitled, "Electroholographic optical switch," whose disclosure is incorporated herein by reference, discloses an optical switch formed of a paraelectric photorefractive material, within which one or several latent holograms are stored, wherein their reconstruction, or activation is controllable by the application of an electric field. The holograms are formed by spatial modulation of the refractive index of the paraelectric photorefractive material, which arises from the quadratic electro-optic effect induced by the combined action of a spatially modulated space charge within the paraelectric photorefractive material and an external applied electric field. U.S. Pat. No. 6,542,264 further discloses a switching network, such as a multistage network, for use in an optical communications system, incorporating at least one optical switch according to the invention.

However, the operation of the optical switches of Agranat et al. requires carefully controlled temperatures, to maintain the material in the paraelectric phase.

Additionally, U.S. Pat. No. 5,684,612, to Wilde, et al., dated Nov. 4, 1997, and entitled, "Method and system for maintaining and controlling the signal-to-noise ratio of holograms recorded in ferroelectric photorefractive materials," whose disclosure is incorporated herein by reference, describes a hologram with a dynamically controlled diffraction efficiency and enhanced signal-to-noise ratio, which is recorded in ferroelectric photorefractive materials, such as strontium barium niobate ($Sr_x Ba_{1-x} Nb_2 O_6$) (SBN), BSTN, SCNN, PBN, BSKNN, $BaTiO_3$, $LiNbO_3$, $KNbO_3$, KTN, PLZT and the tungsten bronze family. The diffraction efficiency of the hologram is dynamically controlled by applying an electric field along the polar axis of the ferroelectric photorefractive recording medium. Electrically controlled diffraction is used in conjunction with hologram fixing and operation of the material at a temperature in the vicinity of or above its Curie temperature to additionally provide prolonged, low-noise readout. The general methods for recording and reconstructing a hologram (or a set of multiplexed holograms), using these techniques is disclosed. A plurality of configurations employing the improved hologram are disclosed, including an optical crossbar switch in guided-wave and free-space formats that can function as a component in a variety of parallel optical processing systems, a reconfigurable dynamic wavelength filter, and a page-based holographic data storage system.

However, the operation of the optical switch of Wilde et al. requires the application of high voltages, in the range of 10 kV.

Transparent materials, whose index of refraction changes with the concentration of a dopant, are known. These include, for example, transition metal oxides, such as $V_2O_5$, $Ta_2O_5$, $MnO_2$, $CoO_2$, $NiO_2$, $Mn_2O_4$, $WO_3$, $TiO_2$, $MoO_3$, $IrO_7$, a combination thereof, as well as a combination of the aforementioned oxides with other oxides, for example, cerium oxide, which may improve the optical properties of the material. Another transparent material, whose index of refraction changes with the concentration of a dopant, is silicon. Rubin et al., [M. Rubin, K. von Rottkay, S.-J. Wen, N. O. zer, and J. Slack, "Optical Indices of Lithiated Electrochromic Oxides," Solar Energy Materials and Solar Cells, 54 (1998) 49-57, Lawrence Berkeley National Laboratory, University of California, Berkeley, Calif. 94720, USA] provide measured values for a few of these materials.

For example, the data presented by Rubin et al., include complex refractive index of $WO_3$ for wavelengths from 300 to 2500 nm as a function of intercalated charge density of Li ions. FIG. 1, which is based on these data, illustrates the effect of Li ion concentration on the real part of the index of refraction, for a wavelength of 1500 nm. As Li ion concentration increases from 0 to 68 $mCcm^{-2} \mu m^{-1}$, the real part of the index of refraction for a wavelength of 1500 nm increases from about 1.9 to about 2.2. Similar data are presented for other materials, such as $V_2O_5$, for which as Li ion concentration increases from 0 to 80 $mCcm^{-2} \mu m^{-1}$, the real part of the index of refraction for wavelengths of between about 900 and 2500 nm increases from about 2.0 to about 2.4. Data are also presented for $LixNi1{\sim}xO$, $Li_xCoO_2$, and $CeO_2$—$TiO_2$.

U.S. Pat. No. 5,311,350, to Hiramatsu, et al., dated May 10, 1994, and entitled, "Optical device and apparatus using the optical device," whose disclosure is incorporated herein by reference, an optical device, comprising a light transmitting optical member of a high molecular material containing mobile ions, and a pair of electrodes formed on surfaces of the optical member, a required potential difference being provided between the electrodes so as to cause ion conduction in the optical member and to reversibly vary a refractive index of the optical member. According to this invention, a refractive index is reversibly varied due to ion conduction, whereby the modulation of a transmitted beam or a reflected beam by the optical device can be reversibly controlled.

The ability to absorb ions makes the transitional metal oxides suitable as electrodes, for high-energy-density batteries. A discussion of this type of electrode may be found in the Handbook of Batteries, second edition, edited by David Linden, and published by McGraw-Hill (1994).

Additionally, U.S. Pat. No. 4,310,609, to Liang, et al., dated Jan. 12, 1982, and entitled, "Metal oxide composite cathode material for high energy density batteries," whose disclosure is incorporated herein by reference, describes an electrochemical cell, which includes cathode materials, comprising at least one metal oxide, at least one metal, or a mixture of metals or metal oxides incorporated in the matrix of a host metal oxide. The cathode materials are constructed by the chemical addition, reaction, or otherwise intimate contact of various metal oxides and/or metal elements during thermal treatment in mixed states. The materials thereby produced contain metals and oxides of the groups IB, IIB, IIIB, IVB, VB, VIB, VIIB, and VIII, which includes the noble metals and/or their oxide compounds. The incorporation of the metal oxides, metals or mixtures thereof substantially increases the discharge capacity and the overall performance of the cathode materials.

Similarly, U.S. Pat. No. 6,085,015, to Armand, et al., dated Jul. 4, 2000 and entitled, "Lithium insertion electrode materials based on orthosilicate derivatives," whose disclosure is incorporated herein by reference, describes an orthosilicate whose structure is based on $SiO_4^4$ tetranions, which contains at least one transition element with at least two valence states. Lithium ingresses or egresses into or from the structure in order to compensate for a change in valency of the redox couple during electrode operation and thereby maintain overall electroneutrality.

Furthermore, U.S. Pat. No. 6,183,910, to Praas, et al., dated Feb. 6, 2001, and entitled "Electrochemical lithium secondary element," whose disclosure is incorporated herein by reference, describes a material which are suitable as an active cathode, for an electrochemical lithium secondary cell are oxygen-deficient spinels $Li_{1+x} Mn_{2-x} O_{4-\delta}$, where $0.1 \toreq x \toreq 0.33$ and $0.01 \toreq \delta \toreq 0.5$. Their region of existence in a phase diagram laid out between the corner points MnO, $MnO_2$ and $Li_2 MnO_3$ for lithium manganese oxide compounds is defined by the corner compounds $LiMn_2 O_4$, $Li_2 Mn_4 O_7$, $Li_8 Mn_{10} O_{21}$ and $Li_{4/3} Mn_{5/3} O_4$, all the compounds along the lines $LiMn_2 O_4$--$Li_{4/3} Mn_{5/3} O_4$ and $LiMn_2 O_4$--$Li_2 Mn_2 O_4$ being excepted. The spinels are produced by a modified ceramic process from a mixture of Li-containing and Mn-containing starting substances whose reaction product is reduced by roasting in an $Ar/H_2$ atmosphere. The Li components x can be replaced partially or completely by foreign monovalent or multivalent cations from the series consisting of Co, Mg, Zn, Ni, Ca, Bi, Ti, V, Rh or Cu.

Transparent materials, whose index of refraction changes with the concentration of a dopant, are used in electrochromatic display devices, which change color when an electric potential is applied. For example, U.S. Pat. 4,060,311, to Green, dated Nov. 29, 1977 and entitled, "Electrochromic device," whose disclosure is incorporated herein by reference, discloses an electrochromic device, operative as a display device, which changes color on application of an electric potential. The electrochromic device is in the form of a cell comprising a first electrode, a metal-sensitive transition metal oxide in contact with the first electrode and a solid fast ion conductor as the electrolyte in contact with the oxide.

Similarly, U.S. Pat. No. 4,256,379, also to Green, dated Mar. 17, 1981, and entitled, "Electrochromic device," whose disclosure is incorporated herein by reference, discloses an electrochromic device, operative as a display device, which changes color on application of an electric potential. The electrochromic device is in the form of a cell comprising a metal-sensitive compound having a thickness of 1 micrometer or less, preferable between 0.5 and 0.05 of a micrometer, is described in contact with a solid fast ion conductor as electrolyte. The fast ion conductor itself is in contact with an electrode capable of providing ions the same as the fast ions of the conductor.

It is furthermore known, that materials whose index of refraction changes with the concentration of a dopant may be used as tunable electrochromic filters. For example, U.S. Pat. No. 4,501,472, to Nicholson, dated Feb. 26, 1985, and entitled, "Tunable electrochromic filter," discloses a device usable as a tunable light filter or as a light valve having an electronically isolated element of a solid, insoluble material capable of reversibly changing state by reaction with soluble reactants. The state-changing element receives the reactants by diffusion through an electrolyte from a generator electrode.

The electrochromatic, or smart windows is a known application that extended from the tunable electrochromic filters. With smart windows users can block either all, or some of the light by simply turning a knob, for example, in order to save on cooling costs.

For example, U.S. Pat. No. 5,699,192, to Van Dine, et al., dated Dec. 16, 1997, and entitled, "Electrochromic structures and methods," whose disclosure is incorporated herein by reference, relates to monolithic electrochromic devices through which energy, including light, can be transmitted, reflected or absorbed under controlled conditions and describes an electrochromic device, which is applied to a substrate. The electrochromic device includes an electrochromic electrode layer, a counter electrode layer, and an ion-conducting layer sandwiched between those two layers and electrically isolating them from each other, in which the ion-conducting layer is substantially uniform across the substrate and comprises an inorganic superstructure with associated organic material and with a microstructure, which facilitates the transfer of ions. Methods for producing these devices are also disclosed, including depositing the ion-conducting layer on the substrate in the form of a solution, and effecting gelation of that solution.

Furthermore, U.S. Pat. No. 5,708,523, to Kubo, et al., dated Jan. 13, 1998 and entitled "Counterelectrode for smart window and smart window", whose disclosure is incorporated herein by reference, describes a counterelectrode for a smart window contains a transparent electrically conductive substrate and a plurality of electrically conductive dots arrayed on the transparent electrically conductive substrate. Each of the electrically conductive dots contains fine particles having capacitance of not less than 1 farad/g or fine particles capable of storing electrical charge of not less than 1 coulomb/g. A smart window contains the aforementioned counterelectrode.

Descriptions of smart windows may also be found in C. G. Granquist, "Electrochromism and Smart Windows Design," Solid State Ionics 53-56, (1992) 479-489, F. E. Ghodsi et al, "Optical and electrochromic properties of sol-gel made $CeO_2$-$TiO_2$ thin films," Electrochimica Acta 44 (1999) 3127-3136, and C. G. Granqvist, Electrochimica Acta 44 (1999) 3005-3015.

A similar effect may also be obtained without an electrolyte. For example, U.S. Pat. No. 5,202,788, to Weppner, dated Apr. 13, 1993, and entitled, "Electrochromic device with ionically or mixed ionically-electronically conductive electrolyte," whose disclosure is incorporated herein by reference, describes an electrochromic device which is especially suitable as a window, mirror or display element, characterized by a multi-layer construction with at least one layer, enclosed between two coated electrodes, of a material which is either ionically- or mixed ionically- and electronically-conductive, whereby at least one of the two electrode layers consists of transparent material and the ionically- or ionically- and electronically-conductive material is at least so long transparent as no excitation takes place by the application of voltage via the electrodes.

SUMMARY OF THE INVENTION

According to one aspect of the present invention, there is provided an optical device, comprising:
 a first conductive layer;
 an optical layer, arranged over said first conductive layer, said optical layer being transparent to at least a wavelength of interest and having an index of refraction, which is a function of a variable, substantially reversible, dopant concentration in said optical layer; and a second conductive layer, arranged over a portion of said optical layer, in accordance with a predetermined pattern.

According to an additional aspect of the present invention, a change in said index of refraction of said optical layer, due to a change in said dopant concentration, does not lead to a change in light absorption of said wavelength of interest, within said optical layer, by more than 10%.

According to an additional aspect of the present invention, said device comprises at least one power source, in communication with said first and second conductive layers.

According to an additional aspect of the present invention, said device comprises at least two power sources, for selectively applying power to different segments of said second conductive layer.

According to an alternative aspect of the present invention, said device comprises a control unit and electrical switches for selectively applying power to different segments of said second conductive layer.

According to an additional aspect of the present invention, said optical layer has an initial uniform concentration of a dopant, and the application of an electric potential causes a substantially reversible gradient in dopant concentration to be formed, wherein said index of refraction is further a function of said dopant concentration gradient in said optical layer.

According to an alternative aspect of the present invention, said optical layer is operative as a first electrode in a chemical cell, and further including:

an ion-storage layer, operative as a second electrode in said chemical cell; and an electrolyte layer, sandwiched between said optical and ion-storage layers, wherein at least one layer selected from the group consisting of said optical layer, said ion storage layer, and a combination thereof, has an initial concentration of dopant, such that there exists a dopant concentration difference between said optical layer and said ion storage layer, and the application of an electric field will cause migration of the dopant between said optical and ion storage layers, resulting in a change in the index of refraction of said optical layer.

According to an additional aspect of the present invention, said electrolyte layer is operative as a wave-guide, and said optical layer is operative as a Grating Wave-guide Coupler.

According to an alternative aspect of the present invention, said device is operative to selectively form and selectively erase a wave-guide, within said optical layer.

According to an alternative aspect of the present invention, said device is operative to selectively form and selectively erase a grating, within said optical layer.

According to an additional aspect of the present invention, said device is operative to selectively form and selectively erase a plurality of grating sets, within said optical layer.

According to an alternative aspect of the present invention, said device is operative to selectively tune an optical path length to a desired value.

According to an alternative aspect of the present invention, said device is operative as a wave-guide switch.

According to an alternative aspect of the present invention, said device is operative as a Mach-Zehndler Interferometer.

According to an alternative aspect of the present invention, said device is operative as an Array Wave-guide Grating.

According to an alternative aspect of the present invention, said device is operative as a Fresnel lens.

According to an alternative aspect of the present invention, said device is operative as a phase pattern for generating a hologram.

According to an additional aspect of the present invention, said optical layer is formed of a material selected from the group consisting of $V_2O_5$, $Ta_2O_5$, $MnO_2$, $CoO_2$, $NiO_2$, $Mn_2O_4$, $WO_3$, $TiO_2$, $MoO_3$, $IrO_7$, a combination thereof, and a combination of the aforementioned oxides with cerium oxide.

According to an alternative aspect of the present invention, said optical layer is formed of silver doped $RbAg_4I_5$.

According to an alternative aspect of the present invention, said optical layer is formed of a material selected from the group consisting of silicon, and a silicon compound.

According to an alternative aspect of the present invention, said optical layer is formed of a polymer.

According to an additional aspect of the present invention, said optical layer is transparent in a range selected from the group consisting of the ultraviolet range of 200-400 nm, the visible range of 400-800 nm, the near infrared range of 800-2000 nm, the mid infrared range of 2000-5000 nm, the telecommunication range of 1300-1600 nm, and a combination thereof.

According to an additional aspect of the present invention, said optical layer is transparent in the x;z plane.

According to an additional aspect of the present invention, said optical layer is transparent along the y axis.

According to an additional aspect of the present invention, said device is transparent in a range selected from the group consisting of the ultraviolet range of 200-400 nm, the visible range of 400-800 nm, the near infrared range of 800-2000 nm, the mid infrared range of 2000-5000 nm, the telecommunication range of 1300-1600 nm, and a combination thereof.

According to an additional aspect of the present invention, said device is transparent in the x;z plane.

According to an additional aspect of the present invention, said device is transparent along the y-axis, perpendicular to said layers.

According to another aspect of the present invention, there is provided a method of selectively forming and selectively erasing an optical feature, comprising:

providing an optical device, which comprises:

a first conductive layer;

an optical layer, arranged over said first conductive layer, said optical layer being transparent to at least a wavelength of interest and having an index of refraction, which is a function of a dopant concentration in said optical layer; and a second conductive layer, arranged over a portion of said optical layer, in accordance with a predetermined pattern, applying an electric potential between said first and second conductive layers, thus causing a reversible change in said index of refraction within said optical layer between said portion and the remainder of said optical layer.

According to another aspect of the present invention, there is provided an optical device, comprising:

a first conductive layer;

an optical layer, arranged over said first conductive layer, said optical layer being transparent to at least a wavelength of interest and having an index of refraction, which is a function of a variable, substantially reversible, dopant concentration in said optical layer; and a second conductive layer, arranged over said optical layer, wherein a change in said index of refraction of said optical layer, due to a change in said dopant concentration, does not lead to a change in light absorption of said wavelength of interest, within said optical layer, by more than 10%.

According to an additional aspect of the present invention, said device is operative as a tunable spacer layer, sandwiched between two quarter-wave stacks, to form a tunable interference filter.

According to another aspect of the present invention, there is provided a method of selectively forming and selectively erasing an optical feature, comprising:

providing an optical device, which comprises:
    a first conductive layer;
    an optical layer, arranged over said first conductive layer, said optical layer being transparent to at least a wavelength of interest and having an index of refraction, which is a function of a dopant concentration in said optical layer; and
    a second conductive layer, arranged over said optical layer; and
applying an electric potential between said first and second conductive layers, thus causing a reversible change in said index of refraction within said optical layer between said portion and the remainder of said optical layer, while maintaining a change in light absorption of said wavelength of interest, within said optical layer, at ±10%.

According to another aspect of the present invention, there is provided a tunable optical filter, comprising:
    alternate strata of indices of refraction of $n_1$ and $n_2$, said $n_1$ and $n_2$ being substantially different from each other;
    conductive layers, arranged along the midst of each stratum; and
    electrolyte layers, arranged between each of said stratum,
    wherein said tunable filter is transparent to at least a wavelength of interest in the y direction, and wherein at least one tunable index of refraction, selected from the group consisting of $n_1$, $n_2$, and both $n_1$ and $n_2$ is a function of a variable, substantially reversible, dopant concentration of its associated stratum.

According to another aspect of the present invention, there is provided a method of producing a tunable filter, comprising:
    arranging alternate strata of indices of refraction of $n_1$ and $n_2$, said $n_1$ and $n_2$ being substantially different from each other, wherein at least one index of refraction, selected from the group consisting of said $n_1$, said $n_2$, and said $n_1$ and $n_2$ is a function of a variable, substantially reversible, dopant concentration of its associated stratum;
    arranging conductive layers, along the midst of each stratum;
    arranging electrolyte layers, between each of said stratum; and
    applying potential differences of alternating polarities to said conductive layers, wherein by said application, a migration of dopant across said electrolyte layers takes place, thus tuning said at least one tunable index of refraction.

According to another aspect of the present invention, there is provided a tunable optical filter, comprising:

a stack of optical layers, said optical layers being transparent to at least a wavelength of interest and having an index of refraction, which is a function of a variable, substantially reversible, dopant concentration gradient in said optical layer; and conductive layers, arranged between said optical layers.

According to another aspect of the present invention, there is provided a method of producing a tunable filter, comprising:
    stacking optical layers, said optical layers being transparent to at least a wavelength of interest and having an index of refraction, which is a function of a variable, substantially reversible, dopant concentration gradient in said optical layers;
    arranging conductive layers, between said optical layers; and
    applying potential differences of alternating polarities to said conductive layers, wherein by said application, a concentration gradient of dopant is formed within said optical layers, thus tuning said filter.

The present invention successfully addresses the shortcomings of the presently known configurations by providing optical devices, having a first conductive layer, an optical layer, arranged over the first conductive layer, and a second conductive layer, arranged over a portion of the optical layer, in accordance with a predetermined pattern. The optical layer is transparent to at least a wavelength of interest and has an index of refraction, which is a function of a variable, substantially reversible, dopant concentration or dopant concentration gradient in it. By applying an electric potential between the first and second conductive layers, a change in the index of refraction is formed within the optical layer, between the portion abut with the predetermined pattern and the remainder of the optical layer. Additionally, the present invention provides optical devices formed as stacks of layered constructions, each layered construction comprising a first conductive layer, an optical layer, arranged over the first conductive layer, and a second conductive layer, arranged over the optical layer, these layered constructions being operable as tunable interference filters.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 2A-2B schematically illustrate an electrochemically controlled optical device, in accordance with a preferred embodiment of the present invention;

FIGS. 3A-3B schematically illustrate the charging, operational, and discharging states of the electrochemically controlled optical device of FIGS. 2A-2B, in accordance with a preferred embodiment of the present invention;

FIGS. 4A-4C schematically illustrate an electrochemically controlled optical device, in accordance with another preferred embodiment of the present invention;

FIGS. 6A-6C schematically illustrate a device, operative to reversibly form and erase a plurality of gratings, in accordance with a preferred embodiment of the present invention;

FIGS. 7A-7B schematically illustrate a device for providing a wave-guide switch, in accordance with a preferred embodiment of the present invention;

FIGS. 8A-8B schematically illustrate a Mach-Zehndler Interferometer, in accordance with a preferred embodiment of the present invention;

DESCRIPTION OF THE PREFERRED EMBODIMENTS

Figure 1:
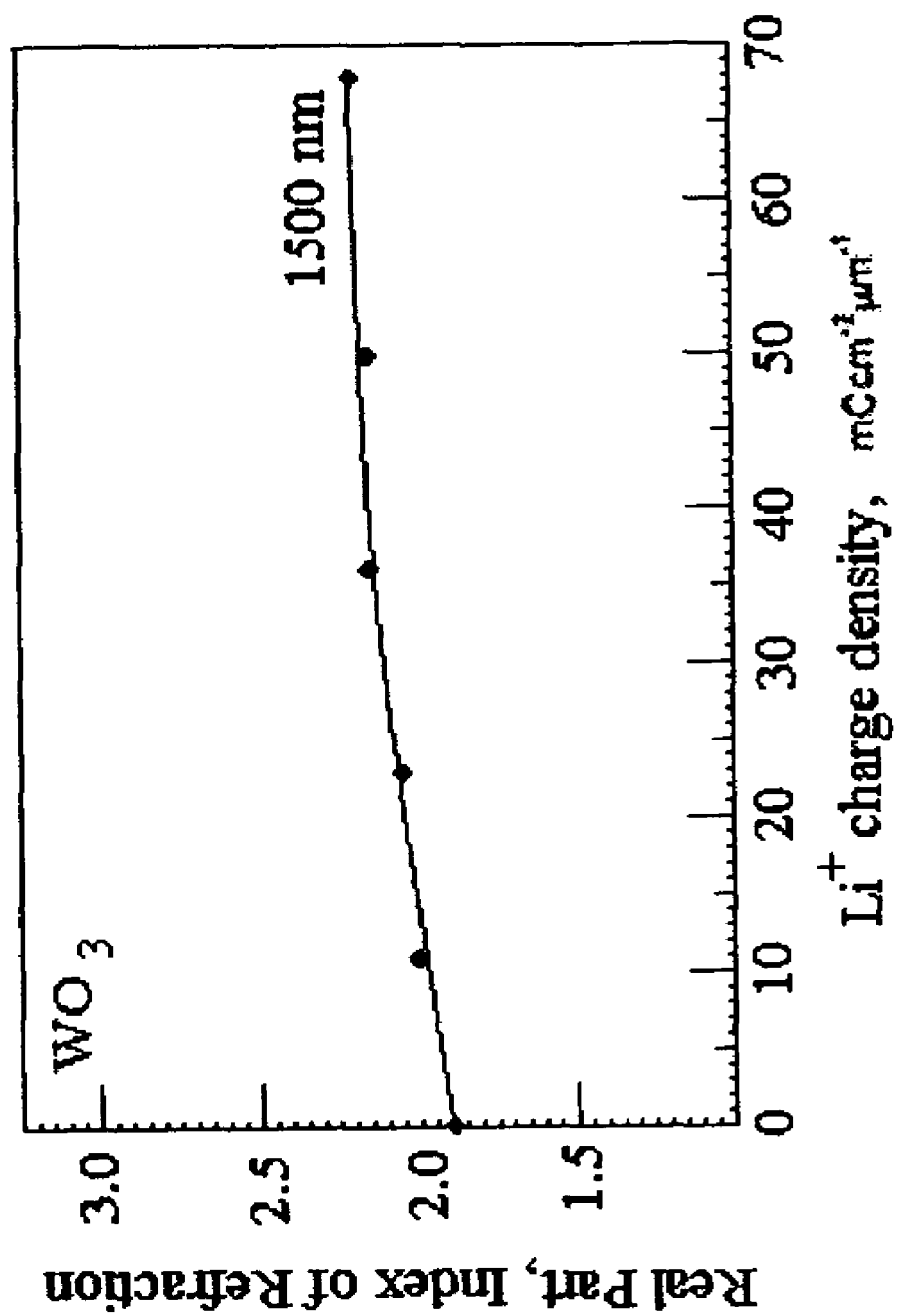
FIG. 1 illustrates the effect of Li ion concentration on the real part of the index of refraction, for a wavelength of 1500 nm, based on prior-art data.

The present invention is of optical devices, having a first conductive layer, an optical layer, arranged over the first conductive layer, and a second conductive layer, arranged over a portion of the optical layer, in accordance with a predetermined pattern. The optical layer is transparent to at least a wavelength of interest and has an index of refraction, which is a function of a variable, substantially reversible, dopant concentration or dopant concentration gradient in it. By applying an electric potential between the first and second conductive layers, a change in the index of refraction is formed within the optical layer, between the portion abut with the predetermined pattern and the remainder of the optical layer. Additionally, the present invention provides optical devices formed as stacks of layered constructions, each layered construction comprising a first conductive layer, an optical layer, arranged over the first conductive layer, and a second conductive layer, arranged over the optical layer, these layered constructions being operable as tunable interference filters.

The principles and operation of the device and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 2A-2B schematically illustrate an electrochemically controlled optical device 10, in accordance with a preferred embodiment of the present invention.

As seen in FIG. 2A, electrochemically controlled optical device 10 defines an x;y;z coordinate system along its axes, wherein in the present embodiment, x is the lateral direction, y is the vertical direction, and z is the direction into the paper. Electrochemically controlled optical device 10 includes a substrate 12, on which a three-layer electrochemical cell 25 has been deposited, sandwiched between first and second conductive layers 14 and 16, preferably of Indium Tin Oxide (ITO), or of another conductive material, which are connected to a power source 24. Three-layer electrochemical cell 25 includes an ion storage layer 18, which is operative as a first electrode, an electrolyte layer 22, and an optical layer 20, operative as a second electrode.

In accordance with the present invention, a dopant concentration in optical layer 20 is formed, or changed, when an electric field is applied between ion storage layer 18 and optical layer 20, causing migration of the dopant between the two layers. In accordance with one preferred embodiment of the present invention, ion storage layer 18 has an initial concentration of dopant, which migrates through electrolyte layer 22 to optical layer 20. Alternatively, optical layer 20 has an initial concentration of dopant, which migrates through electrolyte layer 22 to ion storage layer 18. It will be appreciated that both layers 18 and 20 may have initial concentrations of dopant, which is different from each other. Preferably, electrolyte layer 22 also has an initial concentration of dopant, and it generally remains constant with the application of an electric field. In any of these cases, a change in the dopant concentration of optical layer 20 takes place, when an electric field is applied. The change may be an increase or a decrease in the dopant concentration.

Optical layer 20 may be formed of any material, whose index of refraction changes with the concentration of a dopant, while being transparent at the wavelengths of interest. For example, optical layer 20 may be formed of a transition metal oxides, such as $V_2O_5$, $Ta_2O_5$, $MnO_2$, $CoO_2$, $NiO_2$, $Mn_2O_4$, $WO_3$, $TiO_2$, $MoO_3$, $IrO_7$, a combination thereof, and a combination of the aforementioned oxides with other oxides, for example, cerium oxide, which may improve the optical properties of the material. Alternatively, silver doped $RbAg_4I_5$ may be used, when the dopant is silver. Alternatively, another compound, or a combination of compounds may be used, for example, silicon, a silicon compound, or a polymer. Preferably, the material that is used undergoes little or no change in color, as the index of refraction changes with the concentration of the dopant.

Preferably, the material used for optical layer 20 is transparent in the ultraviolet range of 200-400 nm. Additionally or alternatively, it is transparent in the visible range of 400-800 nm. Additionally or alternatively, it is transparent in the near infrared range of 800-2000 nm. Additionally or alternatively, it is transparent in the mid infrared range of 2000-5000 nm. Additionally or alternatively, it is transparent in the telecommunication range of 1300-1600 nm. It will be appreciated that the material may be transparent for only a portion of any of these ranges, or over a combination of ranges.

It will be appreciated that optical layer 20 may be transparent in any one of the the x;y;z directions or in two or all directions.

In accordance with the present invention, the change in refractive index may have a variety of effects. For example, it may cause the light to be reflected back. Alternatively it may divert the light to another path. Alternatively it may increase or decrease the light-path length, so as to cause a change in phase.

Preferably, a change in the index of refraction of optical layer 20, due to a change in the dopant concentration or concentration gradient does not lead to a change in light absorption of the wavelength of interest, within optical layer 20, by more than 10%.

In accordance with the present invention, optical layer 20 is about 400-600 nm in thickness. It will be appreciated that another thickness is also possible and may be determined by the application.

Ion storage layer 18 may be a metal oxide, or an intercalation material, such as graphite, and may in fact be formed of the same material as optical layer 20. Preferably, it is about 150-250 nm in thickness. It will be appreciated that another thickness is also possible and may be determined by the application.

Electrolyte layer 22 is preferably formed of any ion conducting material that is electrically insulating. This can include aqueous and non-aqueous solutions, polymers, such as Propylene Carbonate, Polymer based gels, sol-gels (metal oxides formed at low temperatures, using wet chemistry), or solid electrolytes, such as LiI, or $RbAg_4I_5$ (when Silver is used as the dopant). Most electrolytes will include a lithium salt dissolved in the electrolyte. Since electrolyte layer 22 is directly adjacent to optical layer 20, it is important that its optical properties be suitable for the application. Preferably, it is about 900-1100 nm in thickness. It will be appreciated that another thickness is also possible and may be determined by the application.

Preferably the ITO layers are about 150-250 nm in thickness. It will be appreciated that another thickness is also possible and may be determined by the application.

The dopant is preferably lithium; due to it's small size and to the stability of lithium based systems. Alternatively, hydrogen ions, which are very small, and thus have the advantage of fast time response, may be used. Alternatively, silver may be useful if a Rubidium Silver Iodide is used for the electrolyte.

It will be appreciated that in some cases, device 10 includes substrate 12, and in others, no substrate is used, and the bulk of layers 14, 18, 22, 20, and 16 is sufficient to be structurally sound.

It will be appreciated that layers 14, 18, 22, 20, and 16 may be formed by known coating and film depositions methods, including vacuum deposition of the metal oxide, sol-gel formation, oxidation of metal films, and others.

When using substrate layer 12, it is preferably, glass or silica, to which first conductive layer 14, for example, of ITO, is applied as a coating. Alternatively, another material may be used. Preferably, the substrate is a transparent substance although reflective or opaque substrates may be useful in some applications.

Second conductive layer 16, for example, of ITO, may also be applied as a coating to optical layer 20, wherein the coating may then be etched to form a desired pattern, to cover only a desired portion of optical layer 20.

During a charging cycle, seen in FIG. 2B, a region of optical layer 20, which is directly under conductive layer 16, absorbs metal ions, for example, Li ions, from electrolyte layer 22. The electron current reduces the metal ions to metal atoms, which remain intercalated in the electrode material, as a dopant, forming a doped region 26. In consequence, doped region 26 has a different index of refraction than the remainder of optical layer 20. For example, where optical layer 20 is formed of $V_2O_5$, optical layer 20 has an index of refraction of 2.1, but doped region 26 may have an index of refraction of, for example, about 1.9 or 1.8, depending on the dopant concentration. (See FIG. 15, hereinbelow.)

During a discharge cycle, when the polarity of power source 24 is reversed, optical layer 20 returns to its uniform state of FIG. 2A.

Electrochemically controlled optical device 10 is therefore a device within which region 26 of a different index of refraction may be reversibly formed and erased, by the application of an electrical potential. Additionally, two interfaces 27, parallel to the y-axis, are reversibly formed and erased between region 26 and the remainder of optical layer 20.

Region 26 may be operative, for example, as a waveguide, into or out of the paper, in the ±z direction. Additionally or alternatively, any one of interfaces 27 may be operative to reflect a specific wavelength λ, in the lateral, x;z plane, that impinges on it.

In accordance with the present invention, optical device 10 may be transparent in the y direction, perpendicular to the layers. Additionally or alternatively, optical device 10 may be transparent also in the x;z plane. Preferably, optical device 10 is transparent in the ultraviolet range of 200-400 nm. Additionally or alternatively, it is transparent in the visible range of 400-800 nm. Additionally or alternatively, it is transparent in the near infrared range of 800-2000 nm. Additionally or alternatively, it is transparent in the mid infrared range of 2000-5000 nm. Additionally or alternatively, it is transparent in the telecommunication range of 1300-1600 nm. It will be appreciated that optical device 10 may be transparent for only a portion of any of these ranges, or over a combination of ranges.

Referring further to the drawings, FIGS. 3A-3B schematically illustrate the charging, operational, and discharging states of the electrochemically controlled optical device of FIGS. 2A-2B, in accordance with a preferred embodiment of the present invention, as follows:

i. as seen in FIG. 3A, in a first region 32, power source 24 is off, and the index of refraction is $n_0$, for example, 1.9, throughout optical layer 20;

ii. during a charging state 34, power source 24 is on, and the index of refraction increases, as a function of a rise time, $\Delta t_1$, until it reaches a desired, operational-level, index of refraction, $n_1$, for example, 2.05, of region 26;

iii. during an operational state 36, power source 24 is off and the index of refraction remains at the level $n_1$, so that region 26 is operative, for example, as a wave-guide; and iv. during a discharging state 38, power source 24 operates at a reversed polarity, and the index of refraction decreases, until it returns to $n_0$, so that region 26 vanishes, and optical layer 20 returns to its original, uniform state.

v. As seen in FIG. 3B, when a greater change in the index of refraction is desired, for example, if for the specific material the index of refraction increases with dopant concentration, and a higher index of refraction is desired, charging state 34 may be maintained for a longer period, $\Delta t_2$, until a higher index of refraction $n_2$ is achieved.

In this manner, optical layer 20 may be tuned to a desired index of refraction, which may vary with the desired application.

It will be appreciated that the process may also be reversed. Initially, optical layer 20 may be uniformly doped, and during discharge, region 26, of zero dopant concentration, is formed. Upon charging, optical layer 20 is again uniformly doped. The advantage of the reverse process is that it may be easier to achieve repeatability for the index of refraction of region 26, when at zero dopant concentration.

Referring further to the drawings, FIGS. 4A-4C schematically illustrate an electrochemically controlled optical device 10, in accordance with another preferred embodiment of the present invention. Accordingly, optical layer 20 is sandwiched between conductive layers 14 and 16, and no electrolyte nor ion storage layers are used. Optical layer 20 has an initial, uniform concentration of dopant, seen in FIG. 4C, as $C_o$. When an electric field is applied across the contacts, ions are caused to drift within optical layer 20, causing an ion concentration gradient, seen in FIG. 4C, as $C_{operative}$, with the highest concentration in a region 28, adjacent to second conductive layer 16. This in turn causes a refractive index gradient, so that in region 28, the refractive index is distinctly different from that of the remainder of optical layer 20. Two interfaces 29, parallel to the y axis, are thus formed between region 28 and the remainder of optical layer 20.

It will be appreciated that generally, the refractive index is a non linear function of ion concentration, so the average refractive index of the optical layer 20 changes as a result of the applied electric field, even as the average concentration does not.

The effect is similar to that reported by U.S. Pat. No. 5,202,788, to Weppner, whose disclosure is incorporated herein by reference. U.S. Pat. No. 5,202,788 describes a electrolyte-less electrochromic system, based on the drift of ions within a Lithium doped Tungsten Oxide (or a combination of Tungsten Oxide with other oxides) layer. However, Weppner is concerned entirely with the electrochromic effect, and does not deal with the change in refractive index.

Region 28 and interfaces 29 may be used for optical applications, for example, to reflect an incoming beam of radiation of a wavelength λ in the lateral. x.z plane, that impinges on one of interfaces 29.

In accordance with the present invention, optical device 30 may be transparent in the y direction, perpendicular to the layers. Additionally or alternatively, optical device 30 may be transparent also in the x;z plane. Preferably, optical device 30 is transparent in the ultraviolet range of 200-400 nm. Additionally or alternatively, it is transparent in the visible range of 400-800 nm. Additionally or alternatively, it is transparent in the near infrared range of 800-2000 nm. Additionally or alternatively, it is transparent in the mid infrared range of 2000-5000 nm. Additionally or alternatively, it is transparent in the telecommunication range of 1300-1600 nm. It will be appreciated that optical device 30 may be transparent for only a portion of any of these ranges, or over a combination of ranges.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non-limiting fashion.

Example 1

In accordance with a preferred embodiment of the present invention, optical device 10 of FIGS. 2A-2B, hereinabove may be operative to reversibly form and erase wave-guide 26. For use as a wave-guide, region 26 must have an index of refraction which is greater than that of its surroundings, that is greater than that of second conductive layer 16, electrolyte layer 22, and optical layer 20. For example, when the indices of refraction of these layers is less than 2.0, for example, 1.7-1.9, and the index of refraction of region 26 is greater than 2.0, for example, 2.15-2.3, region 26 may be selectively formed ot operate as a wave-guide.

Conductive layer 16 should be patterned in the form of the desired wave-guide, for example, by standard lithographic methods.

In a similar manner, optical device 30 of FIGS. 4A-4C, hereinabove may be operative to reversibly form and erase wave-guide 28. For use as a wave-guide, region 28 must have an index of refraction, which is greater than that of its surroundings, that is greater than that of second conductive layer 16 and optical layer 20.

Example 2

Figures 5A, 5B:
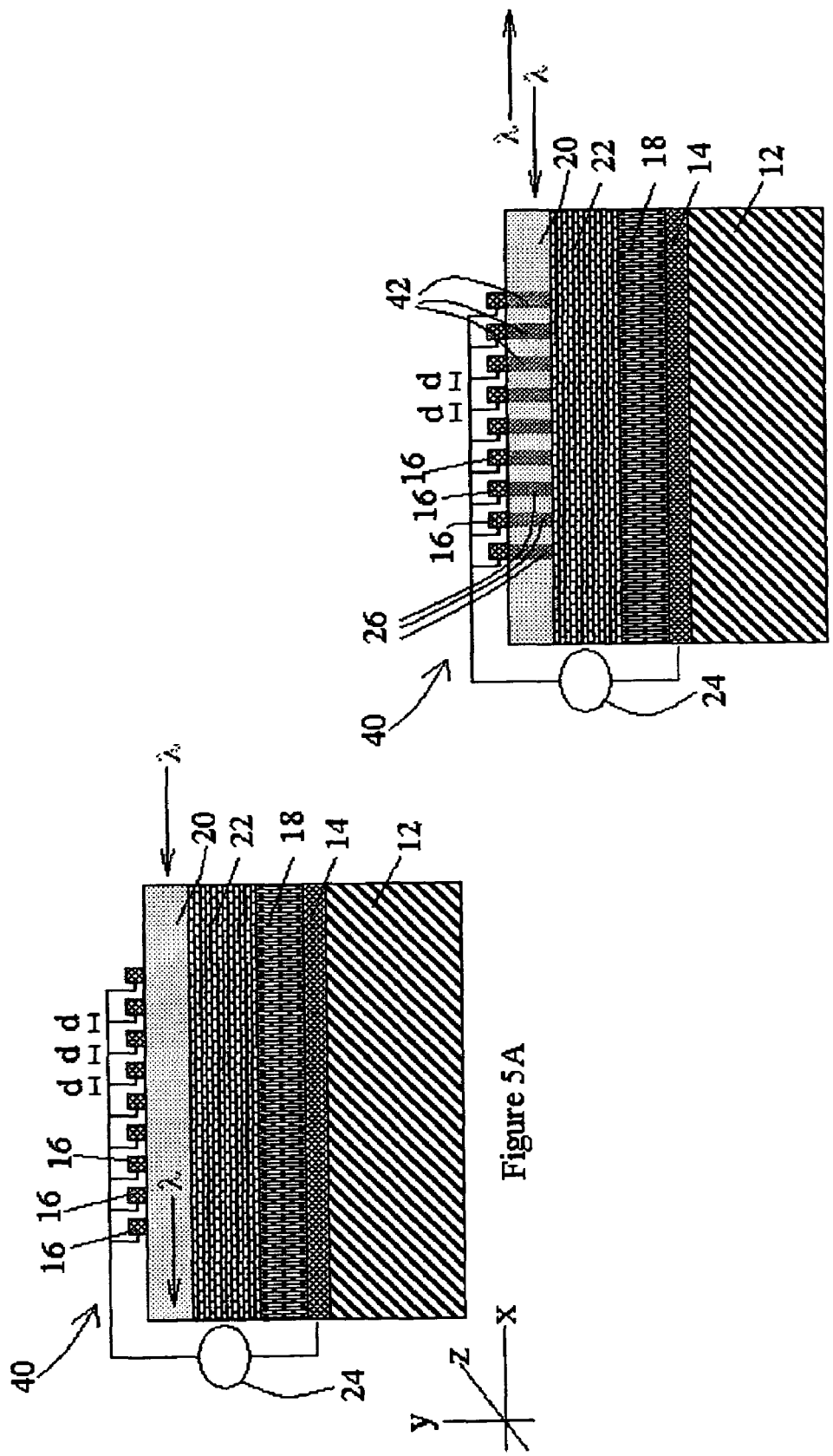
FIGS. 5A-5B schematically illustrate a device, operative to reversibly form and erase a grating, in accordance with a preferred embodiment of the present invention.

Referring further to the drawings, FIGS. 5A-5B schematically illustrate a device 40, operative to reversibly form and erase a grating 42. Grating 42 has a spacing d, and an index of refraction $n_1$, while optical layer 20 has an index of refraction $n_0$. By proper tuning of spacing d, index of refraction $n_1$, vis a vis the index of refraction $n_0$, and by proper selection of a wavelength λ, and a striking angle, grating 42 may be selectively formed, to reflect an incoming wave front, of wavelength λ, traveling in the x;z plane, and striking grating 42 at a particular angle. Additionally, the striking angle may be 90°.

In a similar manner, a grating may be formed on a device in accordance with the teachings of FIGS. 4A-4C.

Example 3

Referring further to the drawings, FIGS. 6A-6B schematically illustrate a device 50, operative to reversibly form and erase at least two sets of gratings $42_1$ and $42_2$, each designed for a specific wavelength and striking angle. For example, grating $42_1$, may have a spacing f, and an index of refraction $n_1$, and grating $42_2$ may have a spacing d, and an index of refraction $n_2$, while optical layer 20 may have an index of refraction $n_0$. Device 50 includes at least two power sources $24_1$, and $24_2$, each operative to form its associated grating independently. In this manner, each of incoming wave fronts $\lambda_1$, and $\lambda_2$, may be independently reflected. Additionally, both wave fronts $\lambda_1$, and $\lambda_2$ may be reflected, or both may be allowed to pass unreflected.

Figure 6C:
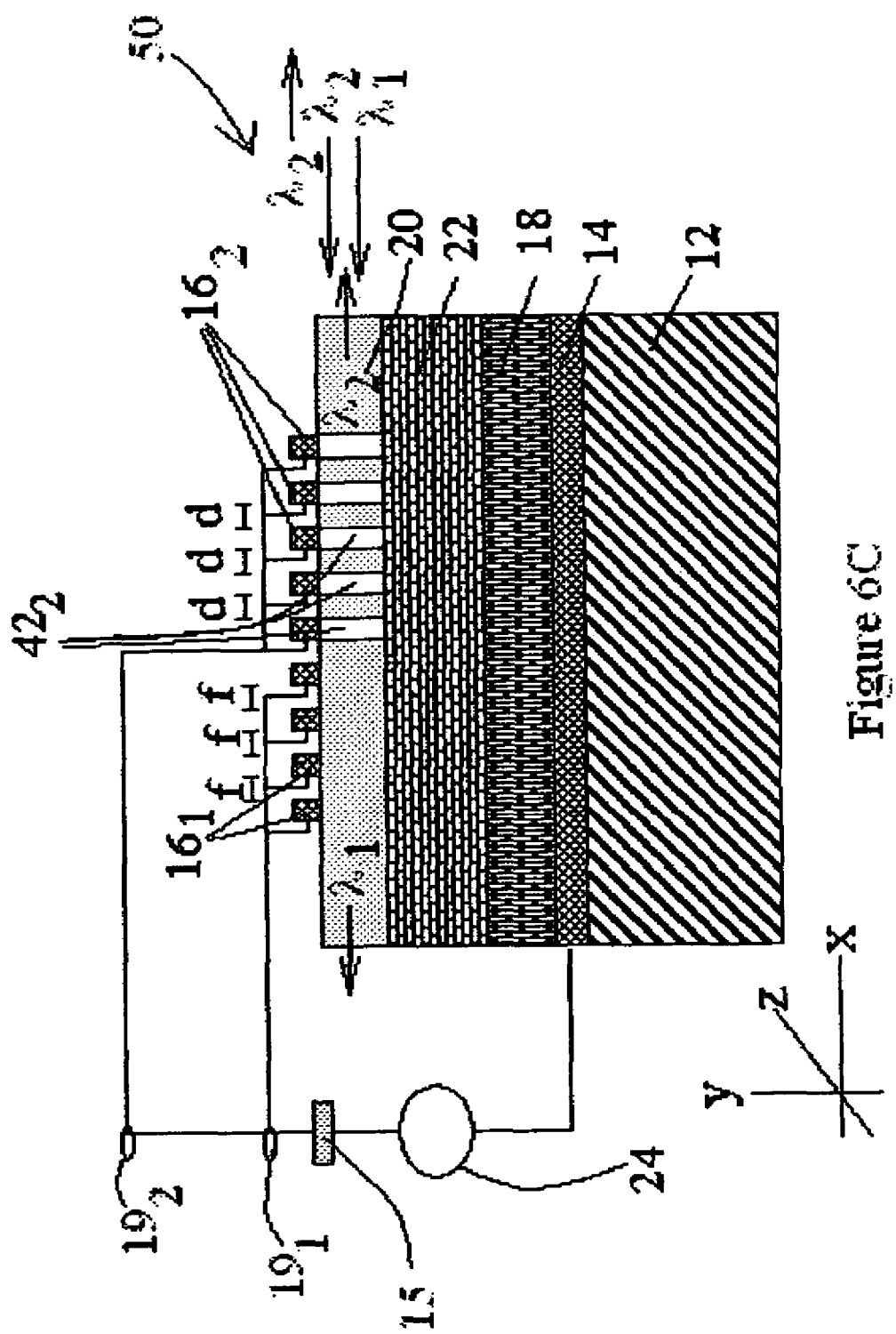

Referring further to the drawings, FIG. 6C schematically illustrates device 50, having one power source 24. Recalling from FIGS. 3A-3B, hereinabove, that during operation, the index of refraction remains stable at the changed level, while power source 24 is off, it will be appreciated that a single power source may be used to bring a plurality of sets of grating to their operational states, one at a time. Accordingly, sets of grating $42_1$ and $42_2$ are associated with corresponding switches $19_1$ and $19_2$, and a control unit 15 scans between them.

It will be appreciated that device 50 may be adapted for more than two sets of grating. It will be appreciated that the grating may also be formed in accordance with the teachings of FIGS. 4A-4C.

Example 4

Referring further to the drawings, FIGS. 7A-7B schematically illustrate a device 70 for providing a wave-guide switch. Device 70 includes a first portion 72, a fork 74, and two prongs 76 and 78. FIGS. 7A and 7B illustrate a top view of the construction in accordance with FIGS. 2A-2B or 4A-4C, wherein first portion 72, fork 74, and prong 76 have a first ITO layer $16_1$, patterned in their shape, while prong 78 has a second ITO layer $16_2$, which is associated with power source 24, and is preferably insulated from ITO layer $16_1$ of the remaining structure.

Prong 76 has a constant index of refraction, while prong 78 has an off-state index of refraction, which is lower than that of prong 76, and an on-state index of refraction, with is higher than that of prong 76. Recalling Fermat's principle, light takes the path which requires the shortest time. Thus, in the off state, light travels in prong 76. However, in the on state, the light travels in prong 78. In this manner, the teachings of FIGS. 2A-2B or 4A-4C can be used to cause the light to switch from prong 76 to prong 78.

Example 5

Referring further to the drawings, FIGS. 8A-8B schematically illustrate a device 80, which includes a Mach-Zehndler Interferometer 82, in accordance with a preferred embodiment of the present invention.

The Mach-Zehndler Interferometer is a well-known wave-guide structure, used in optical switching. In this type of interferometer, light is split into two beams, which merge after a certain distance. If the optical path of the beams is equal, they interfere constructively. If one of the optical paths is longer, there may be destructive interference. This effect can be used in switching and attenuation schemes for optical communications.

FIGS. 8A and 8B illustrate a top view of the construction in accordance with FIGS. 2A-2B or 4A-4C. Mach-Zehndler Interferometer 82 includes arms 84 and 86 of substantially equal lengths. Yet, the bulk of the structure, including arm 84, is covered with ITO layer $16_1$, patterned in its shape, while arm 86 has ITO layer $16_2$, which is associated with power source 24, and is preferably insulated from ITO layer $16_1$ of the remaining structure.

Arm 86 has an off-state index of refraction, which is the same as that of arm 84. Thus in the off-state, constructive interference takes place and the light beam exists Mach-Zehndler Interferometer 82, as seen in FIG. 8A. However, arm 86 has an on-state index of refraction, which is different from that of arm 84, making the optical path of arm 86 different from that of arm 84 by an odd multiple of $\lambda/2$. In consequence, in the on-state, the light beams traveling in arms 84 and 86 interfere destructively, and no light exits Mach-Zehndler Interferometer 82, as seen in FIG. 8B.

Example 6

Figure 9:
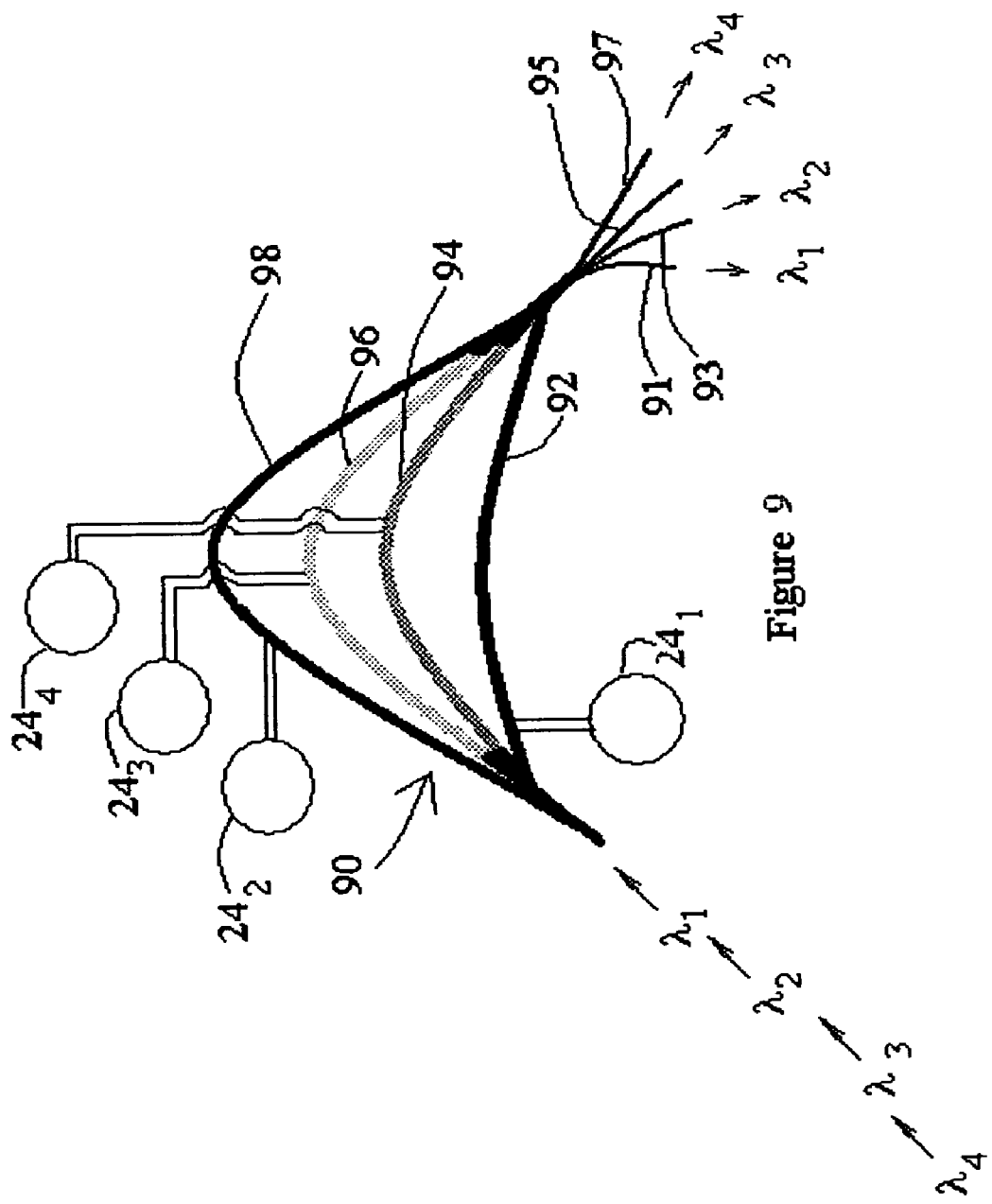
FIG. 9 schematically illustrates an Array Wave-guide Grating (AWG), in accordance with a preferred embodiment of the present invention.

Referring further to the drawings, FIG. 9 schematically illustrates an Array Wave-guide Grating (AWG) 90, in accordance with the present invention.

Array Wave-guide Gratings, or AWGs are wavelength sensitive devices, which are used in multiplexing and demultiplexing, especially in optical communications applications, for example, as add-drop multiplexers.

In an AWG, light is split into a number of paths of different optical lengths, then caused to join and interfere constructively or destructively. Known devices have paths of fixed optical lengths, and are thus suitable for specific, predetermined wavelengths.

However, AWG 90, in accordance with the present invention, has tunable paths of variable optical lengths, and is thus suitable for a greater range of wavelengths.

As seen in FIG. 9 AWG 90, in accordance with the present invention, preferably includes tunable paths, 92, 94, 96, and 98, each in communication with a power source, $24_1$, $24_2$, $24_3$, and $24_4$, and each operative to cause a change in the index of refraction of the optical path associated with it, as taught in conjunction with FIGS. 2A-2B or 4A-4C, hereinabove.

In the example shown in FIG. 9, four distinct wave fronts, of wavelengths $\lambda_1$, $\lambda_2$, $\lambda_3$ and $\lambda_4$ enter AWG 90, which is tuned to separate them into individual exit optical fibers 91, 93, 95, and 97, respectively.

It will be appreciated that a greater or smaller number of wavelengths and exit optical fibers may be used.

Example 7

Figure 10C:
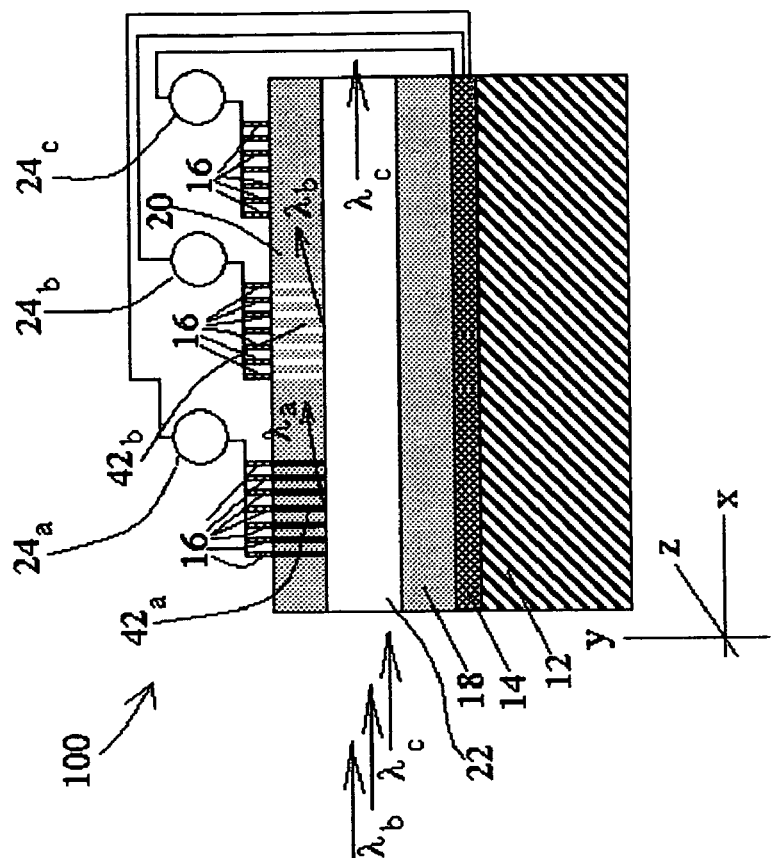
FIGS. 10A-10C schematically illustrate a Grating Waveguide Coupler, in accordance with a preferred embodiment of the present invention.
Figure 10B:
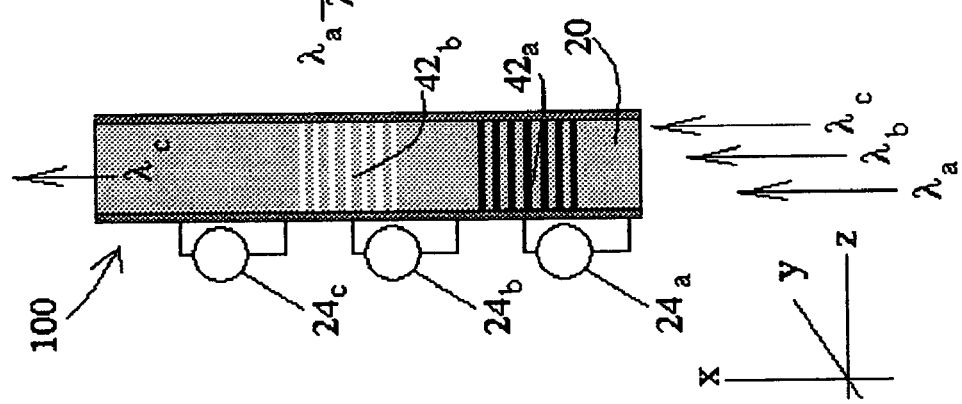
Figure 10A:
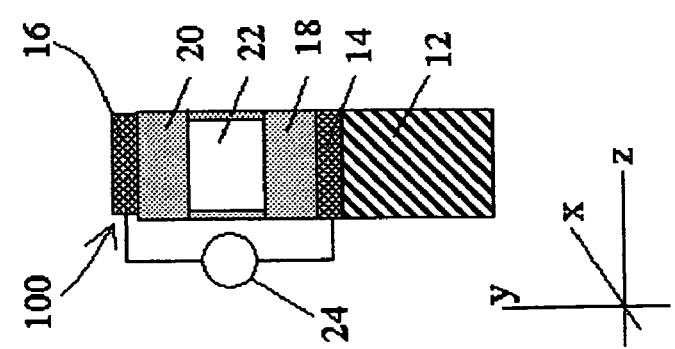
Figure 11A:
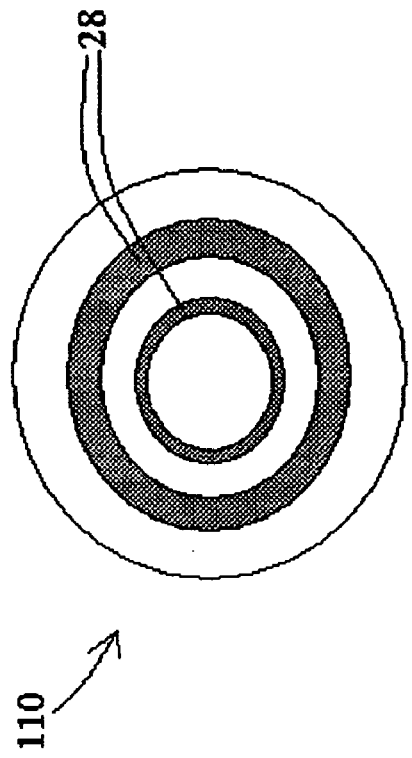
FIGS. 11A-11D schematically illustrate a Fresnel lens, in accordance with a preferred embodiment of the present invention.
Figure 11B:
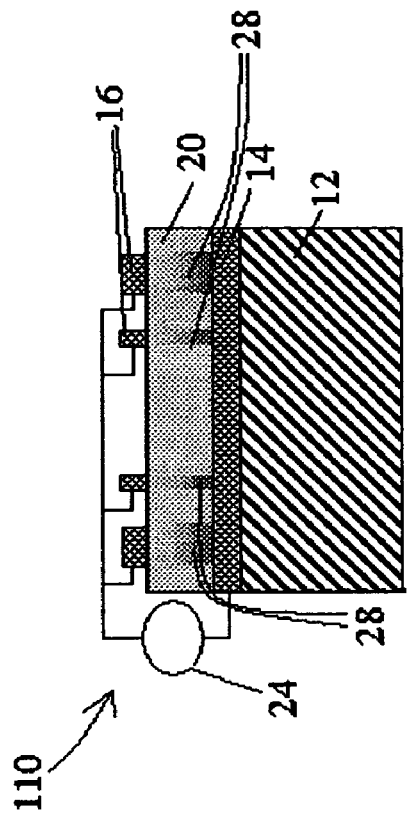
Figure 11C:
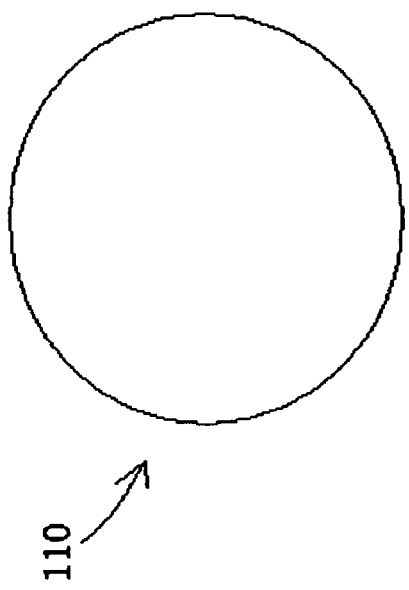
Figure 11D:
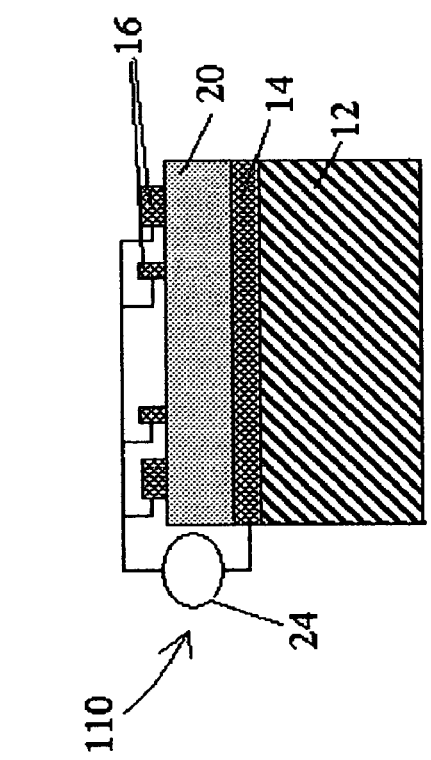

Referring further to the drawings, FIGS. 10A-10C schematically illustrate a Grating Wave-guide Coupler 100, in accordance with the present invention.

Light confined within a wave-guide may be induced to exit the wave-guide through a grating coupler, which is a grating formed in a layer, which bounds the wave-guide.

When the grating is constructed in accordance with the teaching of FIGS. 5A-5B, so as to be reversibly formed and erased, light may be selectively confined to the wave-guide, and selectively induced to exit. Additionally, when several set of grating are formed, in the layer, which bounds the wave-guide, each of a characteristic index of refraction, in accordance with the teaching of FIGS. 6A-6B, wave fronts of several wavelengths may be confined to the wave-guide, and each may be selectively induced to exit, independent of the other beams, by switching a specific grating on.

As seen in FIGS. 10A-10C, of side, top and front views respectively of Grating Wave-guide Coupler 100, a wave-guide is formed in transparent electrolyte layer 22, for incoming wave beams $\lambda_a$, $\lambda_b$, and $\lambda_c$, while optical layer 20 is operative as the layer, which bounds the wave-guide. At least one, and preferably several power sources $24_a$, $24_b$, and $24_c$ are used to form at least one, and preferably several sets of grating, respectively, in optical layer 20.

Power sources $24_a$ is operable to form a grating $42_a$, which will cause incoming wave beams $\lambda_a$ to exit the wave-guide.

Power sources $24_b$ is operable to form a grating $42_b$, which will cause incoming wave beams $\lambda_b$ to exit the wave-guide.

Power sources $24_c$ is operable to form a grating $42_c$, which will cause incoming wave beams $\lambda_c$ to escape the wave-guide.

In the present example, sets of grating $42_a$ and $42_b$ are on, causing incoming wave beams $\lambda_a$ and $\lambda_b$ to exit the wave-guide, while grating $42_c$ is off, so incoming wave beam $\lambda_c$ remains in the wave-guide.

When it is desired that only one grating be switched on at any one time, a single, variable power source may be used.

It will be appreciated that the Grating Wave-guide Coupler may be constructed in accordance with the teaching of FIGS. 4A-4C, where an ITO layer may be operative as a wave guide, bound by the optical layer, which contains the grating.

It will be appreciated that a single power source, a control unit and dedicated switches may be used, as taught in FIG. 6C.

Example 8

Referring further to the drawings, FIGS. 11A-11D schematically illustrate a Fresnel lens 110, in accordance with the present invention.

Fresnel lens 110 is constructed for example, as taught in conjunction with FIGS. 4A-4C, hereinabove, wherein substrate 12 has a round cross section, and the pattern formed by second conductive layer ITO 16, is of concentric rings. When circular regions 28 are formed, the Fresnel lens is activated. In this manner, a solid-state lens is formed, with no moving parts. Tuning the indices of refraction may improve the efficiency of the lens. Fresnel lens 110 can be used in cameras and other imaging devices.

An array of such lenses, with the addition of masks, placed at the focal point of each, can form a type of display. When light is focused by a lens onto a mask, it is blocked by the mask. Defocusing the lens allows light to escape through the mask. Alternatively, by using a negative pattern of this mask, that is, a ring shaped mask, the opposite effect can be achieved—defocusing will be cause the light to be blocked by the ring, and focusing will allow light to escape through the ring.

Example 9

Figure 12:
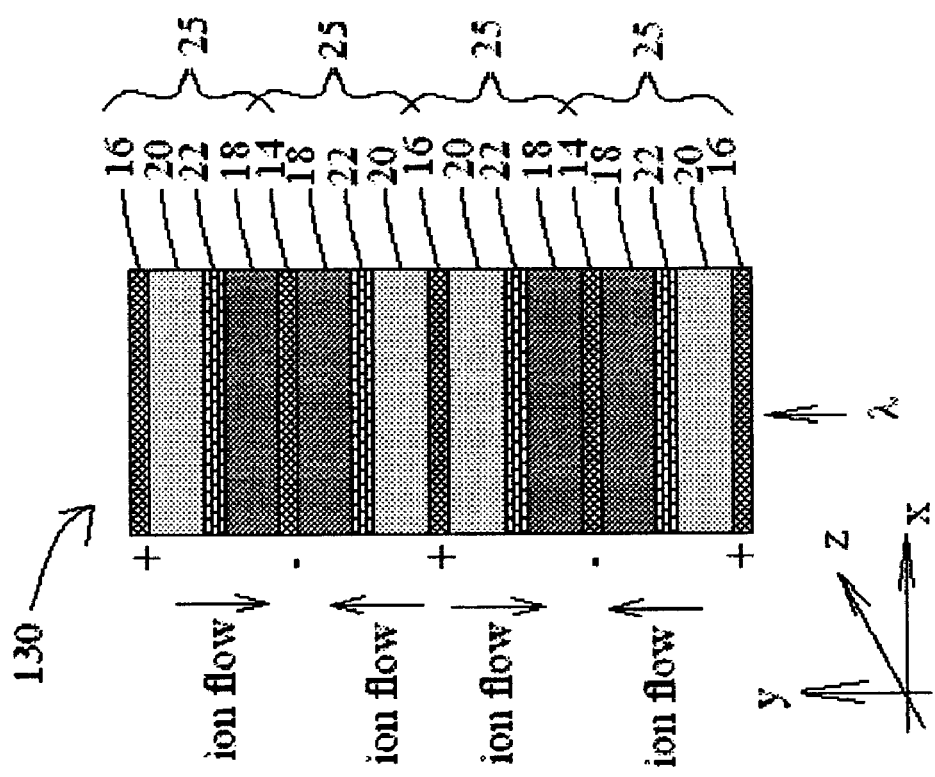
FIGS. 12A-12C schematically illustrate tunable interference filters, in accordance with preferred embodiments of the present invention.
Figure 12:
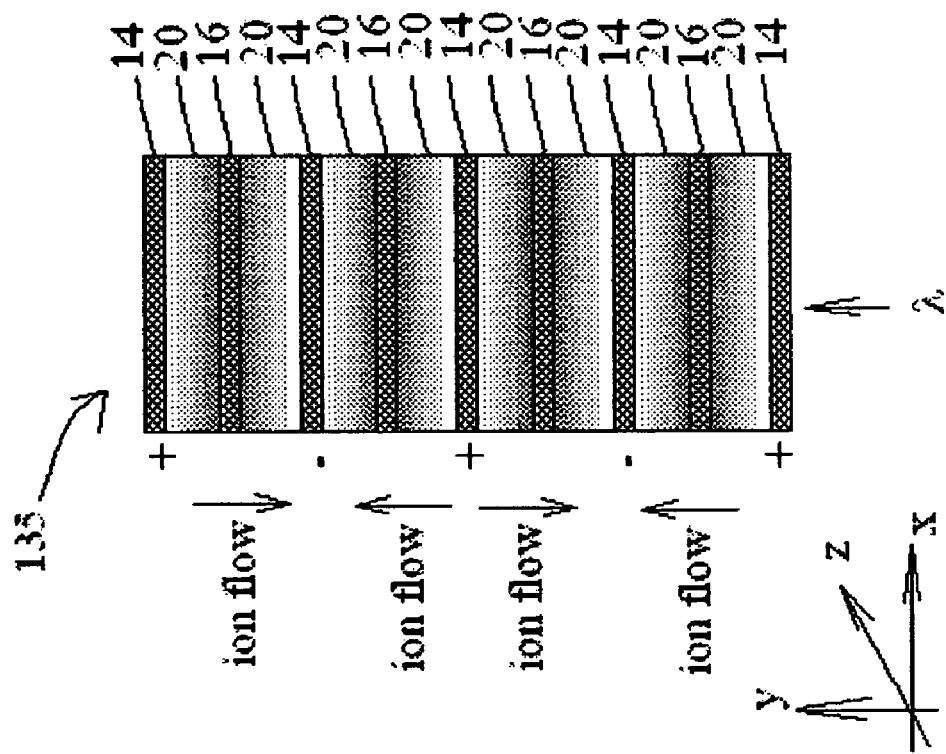
Figure 12:
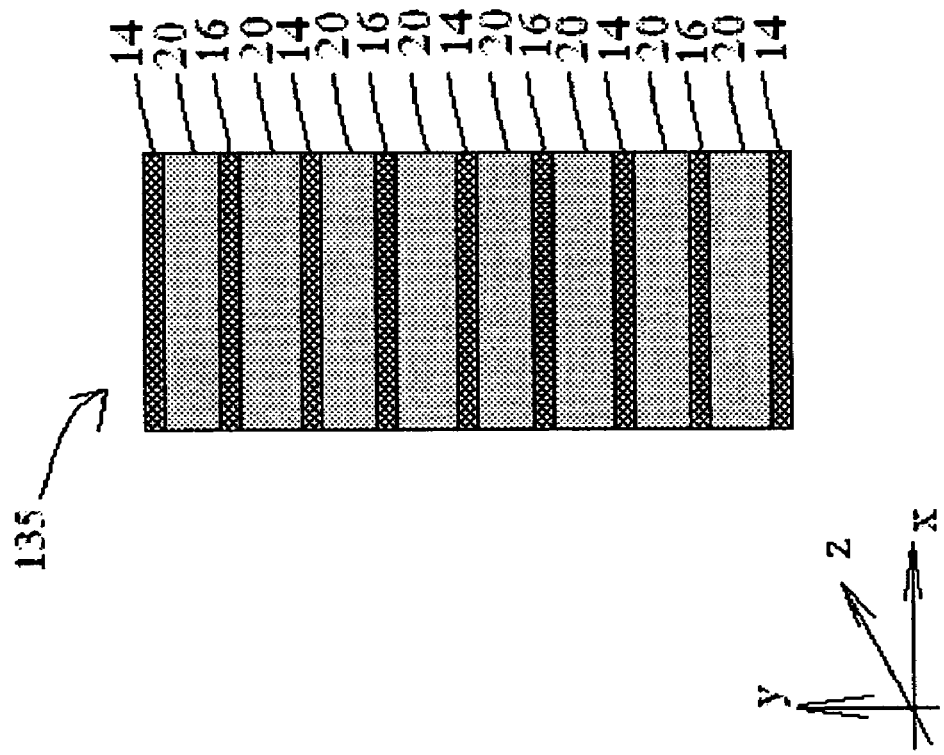

Referring further to the drawings, FIG. 12A schematically illustrates a tunable stack 130, in accordance with the present invention. Tunable stack 130 is made up of a plurality of layered constructions 25, for example, arranged as a quarter-wave stack. A typical dielectric coating consists of a series of thin layers, each a quarter of a wavelength thick, with alternate layers having high or low refractive indices, $n_1$ and $n_2$ respectively. A quarter-wave stack will have a high reflectivity at a particular wavelength, and high transmission at other wavelengths. The quarter-wave structure can be modified to produce a variety of optical filters, such as band pass filters, cutoff filters, and interference filters.

As seen in FIG. 12A, stack 130 is arranged so as to alternate between ion flow in the +y and -y directions. In this manner, two ion storage layers 18 are abut and two optical layers 20 are abut. The two abut layers may be considered a single stratum of a given index of refraction. Thus, alternate strata of high and low refractive indices are formed.

Preferably, conductive layers 14 and 16 of ITO are thin enough to have little effect.

Preferably, both ion storage layer 18 and optical layer 20 may be tuned to a desired wavelength. For example, by varying the refractive indices in the quarter wave stack, the stack can be changed from reflecting to transmitting at a particular wavelength. This effect can be used in optical switching, in add/drop multiplexing for fiber optic communications, as well as in wavelength selective elements in spectrometers, and in any other application in which wavelength dielectric filters are required.

Preferably, both ion storage layer 18 and optical layer 20 are tunable.

Preferably, a same material is used for ion storage layer 18 and for optical layer 20. Preferably, electrolyte 22 is a solid electrolyte.

Alternatively, ion storage layer 18 and optical layer 20 are of different materials. The materials may be chosen to have refractive indices that differ by a large factor, which will contribute to the interference effects in the filter. In such a case, the electrochemical change in the refractive index only provides the "fine tuning of the filter.

In accordance with the present invention, device 130 is transparent, at least in the y direction, in the ultraviolet range of 200-400 nm. Additionally or alternatively, it is transparent in the visible range of 400-800 nm. Additionally or alternatively, it is transparent in the near infrared range of 800-2000 nm. Additionally or alternatively, it is transparent in the mid infrared range of 2000-5000 nm. Additionally or alternatively, it is transparent in the telecommunication range of 1300-1600 nm. It will be appreciated that the device 130 may be transparent for only a portion of any of these ranges, or over a combination of ranges.

In a similar manner, as seen in FIGS. 12B-12C, a tunable stack may be constructed in accordance with the teachings of FIGS. 4A-4C.

The method of producing optical filters is well known and is described, for example, in The Melles Griot Optics Guide, pages 5.29 and 13.25, as well as in Macleod, H. A., "Thin Film Optical Filters," second edition, McGraw Hill, 1989.

Example 10

Figure 13B:
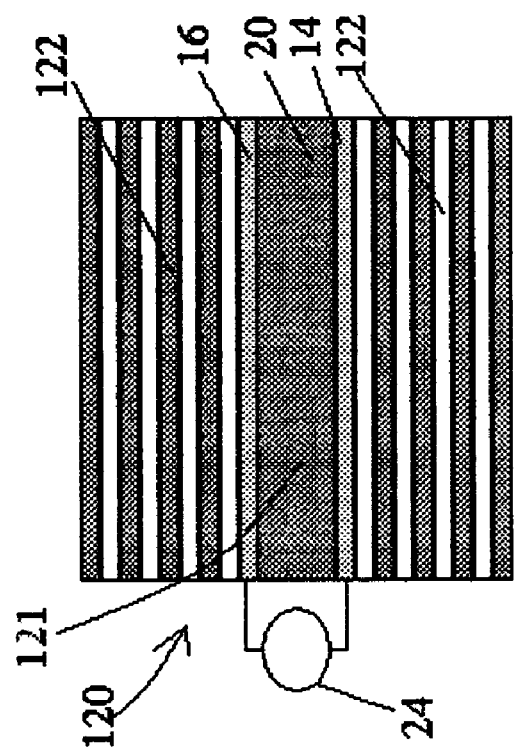
FIGS. 13A-13B schematically illustrate an interference filter with a tunable spacer layer, in accordance with a preferred embodiment of the present invention.
Figure 13A:
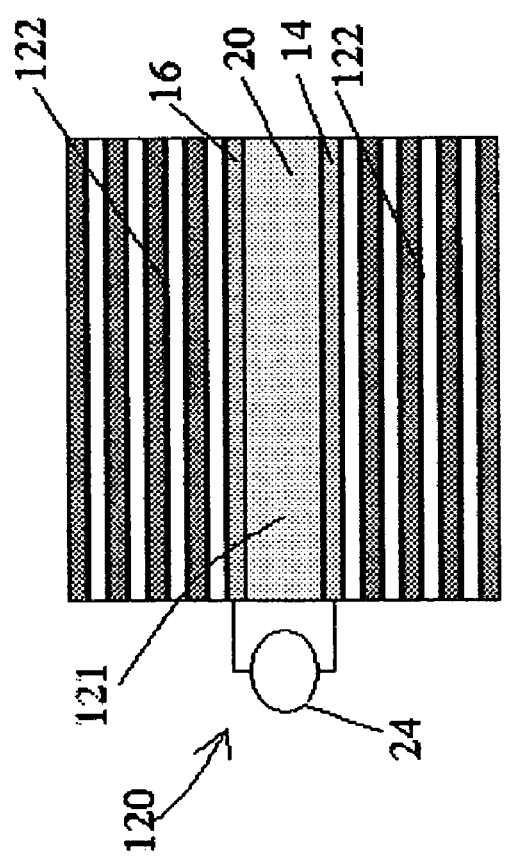

Referring further to the drawings, FIGS. 13A-13B schematically illustrate an interference filter 120, with a tunable spacer layer 121, in accordance with the present invention.

Interference filter 120 is constructed as two conventional quarter-wave stack 122 and a tunable spacer layer 121, which defines the wavelength, which passes through the interference filter. Tunable spacer layer 121 includes tunable optical layer 20, sandwiched between two conductive layers 14 and 16, in accordance with the present invention, as taught hereinabove, in conjunction with FIGS. 4A-4C. By tuning the index of refraction of optical layer 20, a single interference filter may be used for a range of wavelengths. FIGS. 13A and 13B illustrate interference filter 120 tuned to different wavelengths, wherein in FIG. 13A, tunable spacer layer 121 has an index of refraction of $n_1$, and in FIG. 13B, tunable spacer layer 121 has an index of refraction of $n_2$.

It will be appreciated, that a similar system may be constructed in the manner taught in conjunction with FIGS. 2A-2B. In this case, ion storage layer 18 may also be tuned.

Interference filter 120 can be used in spectrometers, Add-Drop Multiplexers, Dynamic Gain Flattening Filters, and other applications.

In accordance with the present invention, device 120 is transparent, at least in the y direction, in the ultraviolet range of 200-400 nm. Additionally or alternatively, it is transparent in the visible range of 400-800 nm. Additionally or alternatively, it is transparent in the near infrared range of 800-2000 nm. Additionally or alternatively, it is transparent in the mid infrared range of 2000-5000 nm. Additionally or alternatively, it is transparent in the telecommunication range of 1300-1600 nm. It will be appreciated that the device 130 may be transparent for only a portion of any of these ranges, or over a combination of ranges.

Example 11

Figure 14B:
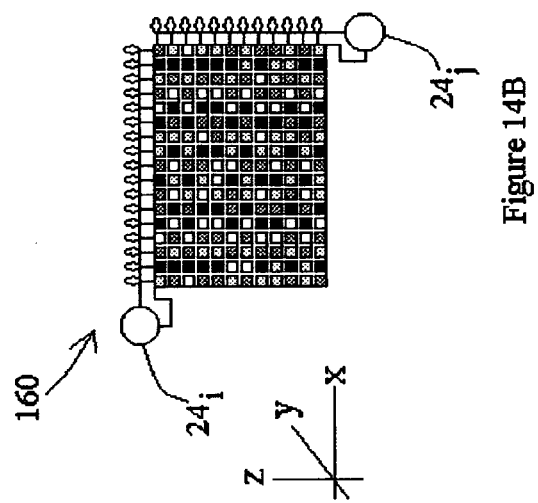
FIGS. 14A-14B schematically illustrate a phase pattern for generating a hologram, in accordance with a preferred embodiment of the present invention.
Figure 14A:
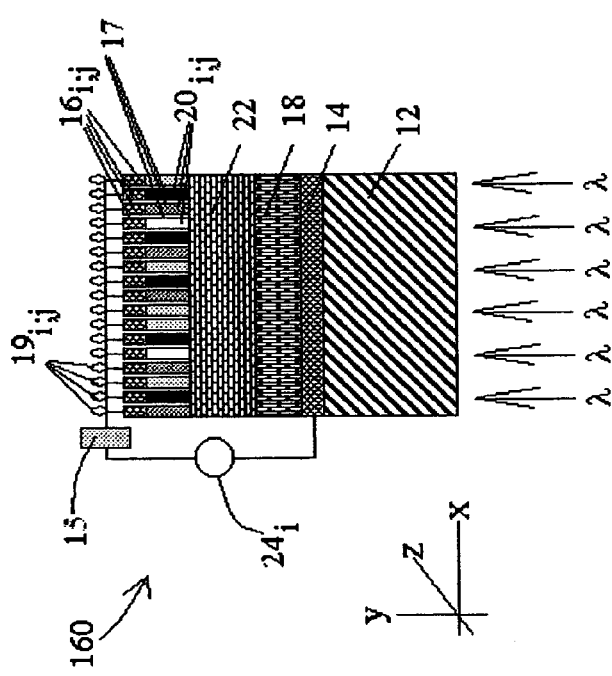

Referring further to the drawings, FIGS. 14A-14B schematically illustrate a phase pattern for generating a hologram 160, in accordance with the present invention. Phase pattern 160 was not written into the material as an interference pattern of two rays. Rather, it is a result of computer simulations of what an interference pattern would be, for a specific hologram. In other words, a computer generates the refractive index pattern required to recreate the three-dimensional image.

Phase pattern 160 is formed of a large plurality of pixels, $20_{i,j}$, in place of optical layer 20 of FIGS. 2A-2B or 4A-4C. Pixels, $20_{i,j}$ are formed by ITO patterns $16_{i,j}$. To prevent cross talk, slits 17 may be used between pixels, as separators.

In accordance with an embodiment of the present invention, each pixel $20_{i,j}$ has a power source.

Alternatively, fewer power sources may be used, arranged to scan over all the pixels. Recalling from FIGS. 3A-3B, hereinabove, that during operation, the index of refraction remains stable at the changed level, while power source 24 is off, it will be appreciated that a single power source may be used to bring a plurality of pixels to their changed levels, one at a time. For example, as seen in FIG. 14B, only i+j power sources are used, for i×j pixels, wherein each j power source scans over all the i pixels. Alternatively, another scanning arrangement may be used. To perform scanning, switches $19_{i,j}$ are associated with each pixel $20_{i,j}$, and control unit 15, which opens and closes switches $19_{i,j}$ performs the scanning.

It will be appreciated that phase pattern for generating a hologram 160 may be used, for example, for a holographic image representing an object designed on a computer or for a reconstruction of a three-dimensional object, such as a 3-dimensional reconstruction based on a set of MRI or CAT images.

EXPERIMENTAL RESULTS

Figure 15:
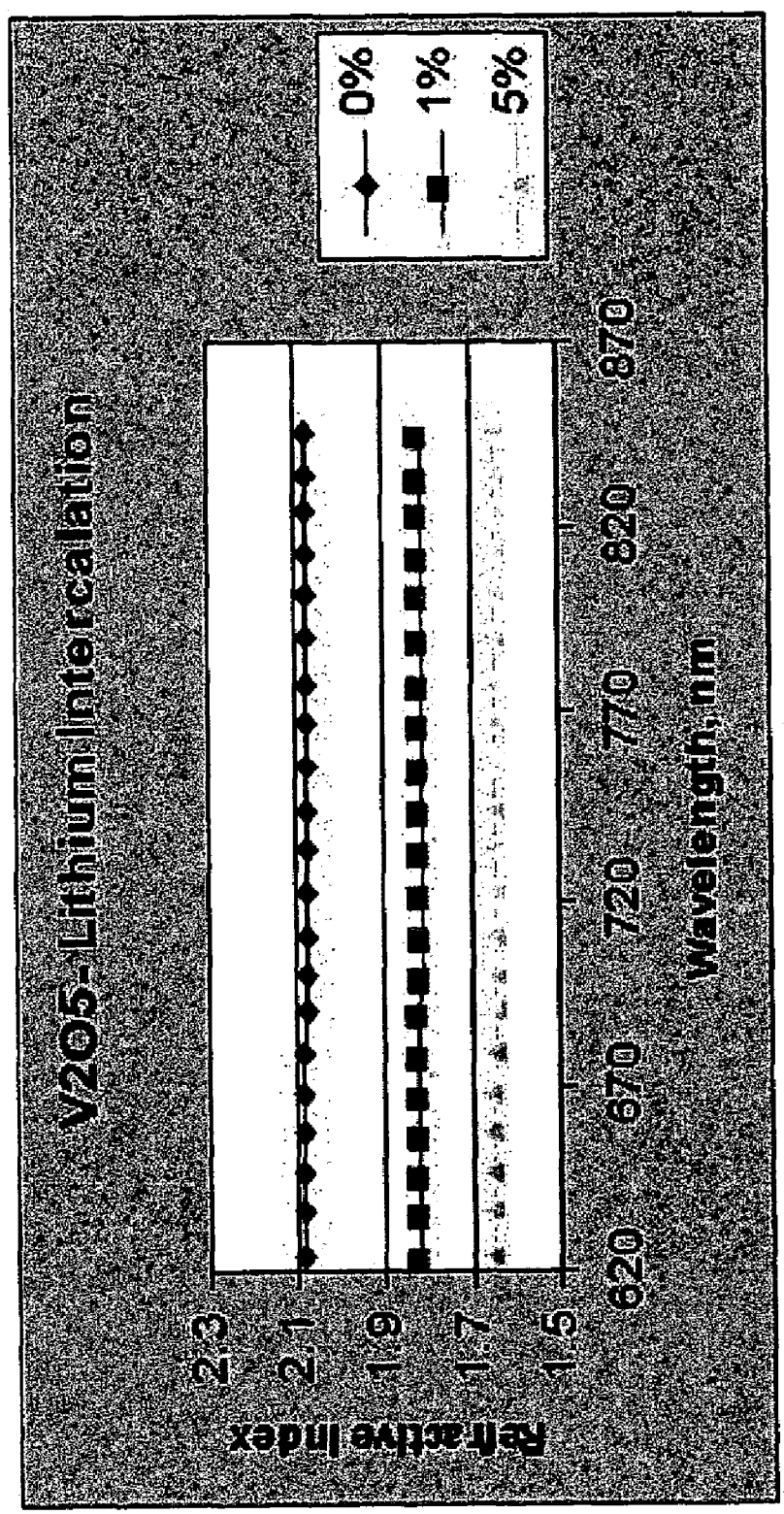
FIG. 15 provides measurements of the refractive index of $V_2O_5$ as a function of lithium concentration.
Figure 16:
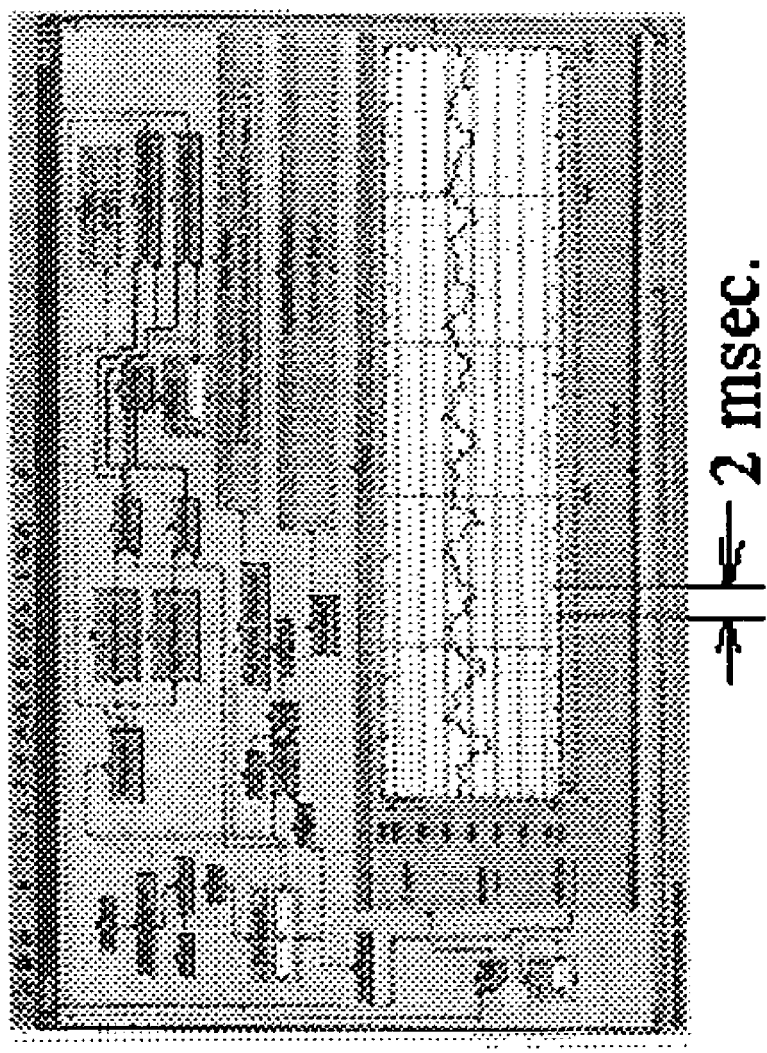
FIG. 16 provides measurements of the rise time $\Delta t$, from the instant power is turned on until a desired change in the refraction index is achieved.

Referring further to the drawings, FIGS. 15 and 16 illustrate some experimental results, in accordance with the present invention.

FIG. 15 provides measurements of the refractive index of $V_2O_5$ as a function of lithium concentration for wavelengths in the range between 620 and about 850 nm, and lithium concentration from 0 to about 5%. As seen in the figures, the index of refraction of $V_2O_5$ decreases from about 2.1 to about 1.65, as lithium concentration from 0 to about 5%. It is further emphasized that the effect is non-linear.

FIG. 16 provides measurements of the rise time Δt, from the instant power is turned on until a desired change in the refraction index is achieved. Measurements, for lithium in $V_2O_5$ show a rise time of about 2 msec., which is sufficient for most applications. It will be appreciated that the rise time is dependent on the change in the required index of refraction, as taught in conjunction with FIGS. 3A-3, hereinabove. Additionally, the rise time gets shorter, with increasing temperature.

As used herein the term "about" refers to ±10%.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An optical device, comprising:
   a first conductive layer;
   an optical layer, arranged over said first conductive layer, said optical layer being transparent to at least a wavelength of interest and having an index of refraction, which is a function of a variable, substantially reversible, dopant concentration in said optical layer;
   a second conductive layer, arranged over a portion of said optical layer, in accordance with a predetermined pattern;
   a power source, in communication with said first and second conductive layers;
   electrical switches, in communication with said power source, each of said electrical switches being in communication with different segments of said second conductive layer, for selectively applying power to different segments of said second conductive layer; and
   a control unit, in communication with said electrical switches, for controlling said selectively applying.

2. The optical device of claim 1, wherein a change in said index of refraction of said optical layer, due to a change in said dopant concentration, leads to a change in light absorption of said wavelength of interest, within said optical layer, which is less than substantially 10%.

3. The optical device of claim 1, wherein said first conductive layer is operative as a wave-guide, and said optical layer is operative as a Grating Wave-guide Coupler.

4. The optical device of claim 1, operative to selectively form and selectively erase a wave-guide, within said optical layer.

5. The optical device of claim 1, operative to selectively form and selectively erase a grating, within said optical layer.

6. The optical device of claim 1, operative to selectively form and selectively erase a plurality of grating sets, within said optical layer.

7. The optical device of claim 1, operative to selectively tune an optical path length to a desired value.

8. The optical device of claim 1, operative as a device selected from the group consisting of a wave-guide switch, a Mach-Zehndler Interferometer, an Array Wave-guide Grating, a Fresnel lens, and a phase pattern for generating a hologram.

9. The optical device of claim 1, wherein said optical layer is formed of a material selected from the group consisting of $V_2O_5$, $Ta_2O_5$, $MnO_2$, $CoO_2$, $NiO_2$, $Mn_2O_4$, $WO_3$, $TiO_2$, $MoO_3$, $IrO_7$, a combination thereof, and a combination of the aforementioned oxides with cerium oxide.

10. The optical device of claim 1, wherein said optical layer is formed of silver doped $RbAg_4I_5$.

11. The optical device of claim 1, wherein said optical layer is formed of a material selected from the group consisting of silicon, and a silicon compound.

12. The optical device of claim 1, wherein said optical layer is formed of a polymer.

13. The optical device of claim 1, wherein said optical layer is transparent in a range selected from the group consisting of the ultraviolet range of 200-400 mm the visible range of 400-800 nm, the near infrared range of 800-2000 nm, the mid infrared range of 2000-5000 nm, the telecommunication range of 1300-1600 nm, and a combination thereof.

14. The optical device of claim 1, wherein said optical layer is transparent in the x;z plane, of an x;y;z coordinate system, wherein x is a lateral direction, y is a vertical direction, and z is a direction along a length of the optical device.

15. The optical device of claim 1, wherein said optical layer is transparent along the y axis, of an x;y;z coordinate system, wherein x is a lateral direction, y is a vertical direction, and z is a direction along a length of the optical device.

16. The optical device of claim 1, wherein said device is transparent in a range selected from the group consisting of the ultraviolet range of 200-400 nm, the visible range of 400-800 nm, the near infrared range of 800-2000 nm, the mid infrared range of 2000-5000 nm, the telecommunication range of 1300-1600 nm, and a combination thereof.

17. The optical device of claim 1, wherein said device is transparent in the x;z plane, of an x;y;z coordinate system, wherein x is a lateral direction, y is a vertical direction, and z is a direction along a length of the optical device.

18. The optical device of claim 1, wherein said device is transparent along the y-axis, perpendicular to said layers.

19. An optical device, comprising:
a first conductive layer;
an optical layer, arranged over said first conductive layer, said optical layer being transparent to at least a wavelength of interest and having an index of refraction, which is a function of a variable, substantially reversible, dopant concentration in said optical layer;
a second conductive layer, arranged over a portion of said optical layer, in accordance with a predetermined pattern; and
at least two power sources, each in communication with said first conductive layer and different segments of said second conductive layer, for selectively applying power to said different segments of said second conductive layer.

20. An optical device, comprising:
a first conductive layer;
an optical layer, arranged over said first conductive layer, said optical layer being transparent to at least a wavelength of interest and having an index of refraction, which is a function of a variable, substantially reversible, dopant concentration in said optical layer;
a second conductive layer, arranged over a portion of said optical layer, in accordance with a predetermined pattern; and
at least one power source, in communication with said first and second conductive layers,
wherein said optical layer is operative as a first electrode in a chemical cell, and further including:
an ion-storage layer, operative as a second electrode in said chemical cell; and
an electrolyte layer, sandwiched between said optical and ion-storage layers,
wherein at least one layer selected from the group consisting of said optical layer, said ion storage layer, and a combination thereof, has an initial concentration of dopant, such that there exists a dopant concentration difference between said optical layer and said ion storage layer, and the application of an electric field will cause migration of the dopant between said optical and ion storage layers, resulting in a change in the index of refraction of said optical layer,
and wherein said electrolyte layer is operative as a wave-guide, and said optical layer is operative as a Grating Wave-guide Coupler.

21. A method of selectively forming and selectively erasing an optical feature, comprising:
providing an optical device, which comprises
a first conductive layer;
an optical layer, arranged over said first conductive layer, said optical layer being transparent to at least a wavelength of interest and having an index of refraction, which is a function of a dopant concentration in said optical layer; and
a second conductive layer, arranged over a portion of said optical layer; and
applying an electric potential between said first and second conductive layers, thus causing a reversible change in said index of refraction within said optical layer between said portion and the remainder of said optical layer, while maintaining a change in light absorption of said wavelength of interest, within said optical layer, at ±10%.

22. A tunable optical filter, comprising
alternate strata of indices of refraction of $n_1$ and $n_2$, said $n_1$ and $n_2$ being substantially different from each other;
conductive layers, arranged along the midst of each stratum; and
electrolyte layers, arranged between each of said stratum;
wherein said tunable filter is transparent to at least a wavelength of interest in the y direction, of an x;y;z coordinate system, wherein x is a lateral direction, y is a vertical direction, and z is a direction along a length of the tunable optical filter;
and wherein at least one tunable index of refraction, selected from the group consisting of $n_1$, $n_2$, and both $n_1$ and $n_2$, is a function of a variable, substantially reversible, dopant concentration of its associated stratum.

23. A method of producing a tunable filter, comprising:
arranging alternate strata of indices of refraction of $n_1$ and $n_2$, said $n_1$ and $n_2$ being substantially different from each other, wherein at least one index of refraction, selected from the group consisting of said $n_1$, said $n_2$, and said $n_1$ and $n_2$, is a function of a variable, substantially reversible, dopant concentration of its associated stratum;

arranging conductive layers, along the midst of each stratum;

arranging electrolyte layers, between each of said stratum; and applying potential differences of alternating polarities to said conductive layers, wherein by said application, a migration of dopant across said electrolyte layers takes place, thus tuning said at least one tunable index of refraction.

24. A tunable optical filter, comprising:

a stack of optical layers, said optical layers being transparent to at least a wavelength of interest and having an index of refraction, which is a function of a variable, substantially reversible, dopant concentration gradient in said optical layers; and conductive layers, arranged between said optical layers.

25. A method of producing a tunable filter, comprising stacking optical layers, said optical layers being transparent to at least a wavelength of interest and having an index of refraction, which is a function of a variable, substantially reversible, dopant concentration gradient in said optical layers;

arranging conductive layers, between said optical layers; and applying potential differences of alternating polarities to said conductive layers, wherein by said application, a concentration gradient of dopant is formed within said optical layers, thus tuning said filter.

* * * * *